US008392946B2

(12) United States Patent
Hnyk et al.

(10) Patent No.: US 8,392,946 B2
(45) Date of Patent: Mar. 5, 2013

(54) METHOD OF RECOMMENDING LOCAL AND REMOTE CONTENT

(75) Inventors: Ruediger Hnyk, Friedberg (DE); Frank Fritz Heider, Germering (DE); Tassilo Volker Raesig, Landshut (DE); Jose Alexandre Simoes Rodrigues, Landshut (DE)

(73) Assignee: Sony Europe Limited, Weybridge (GB)

( * ) Notice: Subject to any disclaimer, the term of this patent is extended or adjusted under 35 U.S.C. 154(b) by 338 days.

(21) Appl. No.: 12/774,984

(22) Filed: May 6, 2010

(65) Prior Publication Data

US 2010/0293576 A1  Nov. 18, 2010

(30) Foreign Application Priority Data

May 13, 2009 (EP) .................................. 09006493

(51) Int. Cl.
G06F 3/00 (2006.01)
G06F 13/00 (2006.01)
H04N 5/445 (2011.01)

(52) U.S. Cl. ................ 725/49; 725/45; 725/46; 725/59; 725/141

(58) Field of Classification Search .................... 725/41, 725/45, 46, 49, 59, 141
See application file for complete search history.

(56) References Cited

U.S. PATENT DOCUMENTS

| 6,973,663 | B1 | 12/2005 | Brown et al. | |
| 7,979,880 | B2* | 7/2011 | Hosea et al. | 725/46 |
| 2004/0003413 | A1* | 1/2004 | Boston et al. | 725/133 |
| 2007/0214488 | A1 | 9/2007 | Nguyen et al. | |
| 2007/0288963 | A1* | 12/2007 | Ahmad-Taylor et al. | 725/46 |
| 2008/0148179 | A1 | 6/2008 | Sloo | |
| 2008/0276266 | A1* | 11/2008 | Huchital et al. | 725/32 |
| 2008/0295133 | A1* | 11/2008 | Pronk et al. | 725/46 |
| 2008/0301739 | A1* | 12/2008 | Goldeen et al. | 725/88 |
| 2010/0313238 | A1* | 12/2010 | Baumgartner et al. | 725/153 |

FOREIGN PATENT DOCUMENTS

| EP | 2 015 577 A1 | | 1/2009 |
| WO | WO 00/40021 | * | 7/2000 |
| WO | WO 02/11440 A2 | | 2/2002 |
| WO | WO 02/11440 A3 | | 2/2002 |
| WO | WO 2007/063468 A1 | | 6/2007 |

OTHER PUBLICATIONS

Office Action issued Jun. 30, 2011, in European Patent Application 09 006 493.2. Chinese Office Action issued Mar. 27, 2012 in patent application No. 201010182885.3 (English translation only).

* cited by examiner

*Primary Examiner* — Brian Pendleton
*Assistant Examiner* — Nnenna Ekpo
(74) *Attorney, Agent, or Firm* — Oblon, Spivak, McClelland, Maier & Neustadt, L.L.P.

(57) ABSTRACT

A method of recommending local and remote content, comprising: receiving, at a television apparatus, a first set of content items and linking information linking each of the content items of the first set to a respective subset of the first set; providing a second set of further content items, the content items of the second set being locally available at the television apparatus; and determining for each content item in a unified set including the first and second sets further linking information linking the content item to a further subset from the unified set; wherein for a certain content item of the first set, the further subset is determined by adding content items of the second set to the respective subset of the certain content item, the content items added being determined by comparing meta data associated with the certain content item with meta data respectively associated with all content items of the second set.

14 Claims, 13 Drawing Sheets

METHOD OF RECOMMENDING LOCAL AND REMOTE CONTENT

An embodiment of the invention relates to a method of recommending local and remote content. Further embodiments of the invention relate to a television apparatus, a system, and a computer readable storage medium adapted for recommending local and remote content.

BACKGROUND

Nowadays, a large amount of information sources providing video data are accessible for receivers such as television apparatuses. This is on the one hand due to the efficient transmission of video data e.g. via digital broadcasting. On the other hand, further information sources providing, inter alia, video data are accessible via other networks, such as the internet. For example, in Europe more than 1000 broadcast channels and 1000 internet TV channels are available today.

On top of this, the availability of cheap storage makes it affordable to record and store a large amount of content, e.g. video data, on the end user side.

Due to the enormous amount of information sources remotely and locally available, linear channel zapping or channel hopping through channels of content broadcast in a linear, scheduled fashion is now burdensome for the user and unlikely to be the quickest method for the user to find a content item of interest.

It is therefore an object of the invention to provide a method of recommending local and remote content, allowing a user of a television apparatus to get a quick and easy to use overview on the content of interest available, thereby enhancing the user's television experience.

This object is solved by a method, a television apparatus, a system and a computer readable storage medium according to the independent claims.

Further details of the invention will become apparent from a consideration of the drawings and the ensuing description.

BRIEF DESCRIPTION OF THE SEVERAL VIEWS OF THE DRAWINGS

The accompanying drawings are included to provide a further understanding of the embodiments and are incorporated in and constitute a part of this specification. The drawings illustrate embodiments and together with the description serve to explain principles of the embodiments. Other embodiments and many of the intended advantages of embodiments will be readily appreciated as they become better understood by reference of the following description. The elements of the drawings are not necessarily to scale relative to each other. Like reference numerals designate corresponding similar parts.

FIG. 4b illustrates determination of a further subset of content items including locally available content in the embodiment of FIG. 4a.

FIG. 5b illustrates a further step according to the embodiment of FIG. 5a.

DETAILED DESCRIPTION

In the following, embodiments of the invention are described. It is important to note that all described embodiments may be combined in a way, i.e. that there is no limitation that certain described embodiments may not be combined with others. Further, it should be noted that the same reference signs throughout the Figures and within the description denote same or similar elements.

It is further to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
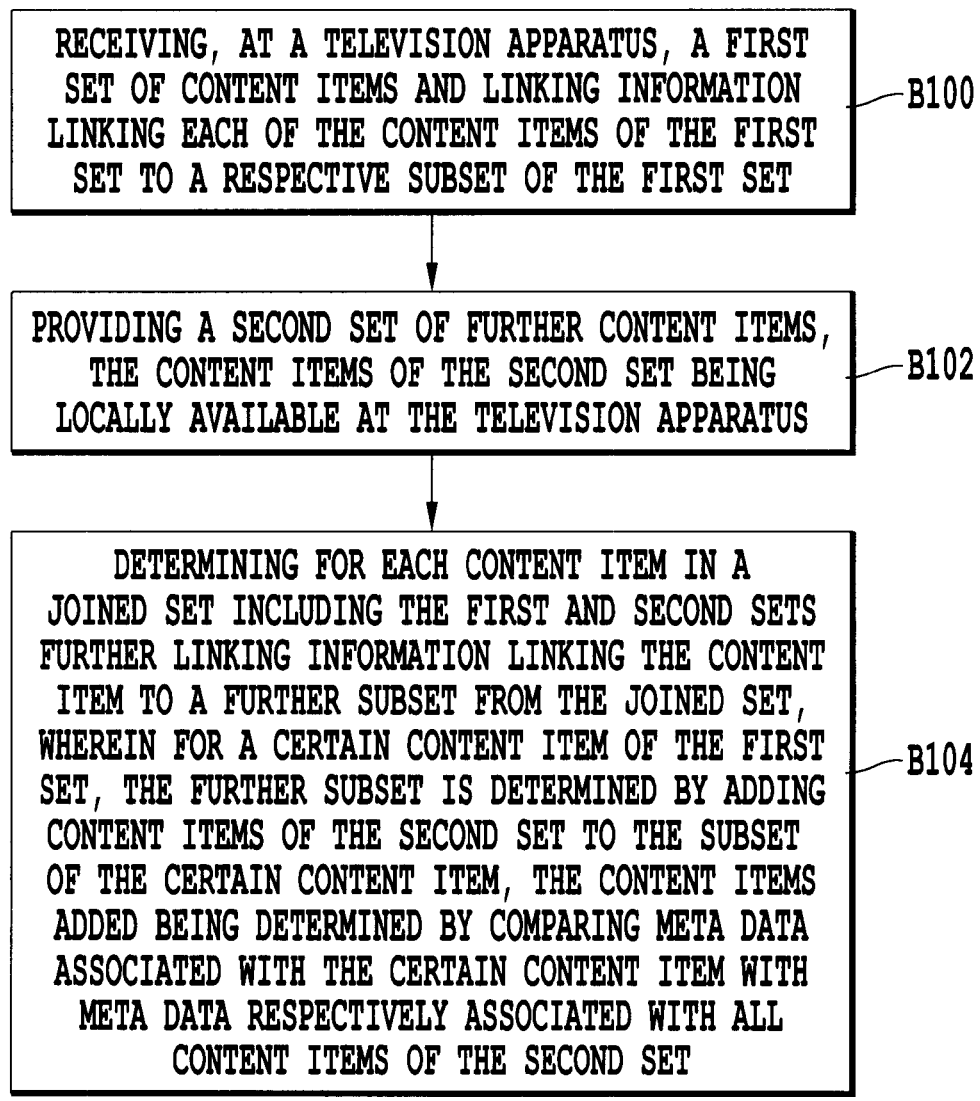
FIG. 1 illustrates an embodiment of a method of recommending local and remote content.

In FIG. 1, an embodiment of a method of recommending local and remote content is illustrated.

At B100, a first set of content items may be received at a television apparatus.

The television apparatus may be any kind of receiving device adapted to receive television broadcast signals, to decode a channel from the television broadcast signal and/or to display the content received from the television broadcast signal and/or the channel to a user. It may further include storage for storing data and/or local content.

The television apparatus may include a television connected "back box" device, a set top box, a gaming console with spare processing and memory capabilities and an Internet connection, a "Living Room" PC having potentially a large amount of local storage and access to a local "home" network connecting further storage capacities, a TV connected playing console with spare processor and memory capabilities and an Internet connection, and/or any other device with a general purpose processor and a local memory data storage.

The television apparatus may be adapted to receive e.g. digital television signals, for example according to a DVB, ATSC, ISDB or DMB standard. Accordingly, transmission of the broadcast signal may be realized by terrestrial transition (DVB-T, DVB-T2, DVB-H, DVB-SH, ATSC, ATSC-M/H, ISDB-T or T-DMB), by cable transmission (DVB-C, ATSC, ISDB-C), by microwave transmission (DVB-MT, DVBMC or DVB-MS), satellite transmission (DVB-S, DVB-S2, DVB-SH, DVB-SMATV, ISDB-F or S-DMB) and/or by internet transmission (DVB-IPTV).

The television signal may transmit a plurality of channels. "Channel" should be understood as that which is conventionally understood by a user, e.g. BBC1, ZDF, TF1 or Fox News, which is termed a service in the DVB environment. Program or Event should be understood as broadcast of finite duration on a channel, such as Desperate Housewives, Tuesday 24 March, 18:45 to 19:00 and a channel name or number.

The content items received at the television apparatus may include multimedia data items for user consumption. In the following, the term "consuming" or "consumption" when applied to content items is intended to be understood as being derived from the term "consumer". Just as a consumer would look to buy, make use of or otherwise acquire goods or services, a consumer can be said to consume content items. Content items need not be bought in exchange for monies by consumers; they may be delivered for example by free to air delivery. Consuming of a content item may for example include watching, listening, displaying, editing, manipulating, copying, moving, previewing, navigating through, selecting, recording, reproducing or more generally initiating an activity in respect of a content item.

Further, each of the content items received at the television apparatus may include meta data related to the multimedia data, the meta data describing characteristics of the multimedia data, e.g. of its content. Such meta data may, for example, be suited for use in an electronic program guide (EPG) system, including a description of the content of the multimedia data items, of participating persons such as actors or moderators, and further content-related information. Further, the meta data may include information on an availability of the multimedia item, e.g. may be indicating a time and channel of its broadcast, e.g. including triplet and timing information, or an URI for its download. Triplet information, as used in digital television broadcasting, includes three parts: a first part, also referred to as original network ID (OID), a second part, also referred to as transport stream ID (TSID), and a third part, also referred to as service ID (SID). In the case of DVB, the triplet may be written as DVB://OID.TSID.SID. The meta data may be in accordance with the MPEG-7 and/or TV-Anytime standards.

For example, the content items may include program events of television channels of broadcast and/or internet television. For example, the content items may include program events scheduled to be broadcast within a predetermined period of time in the future.

Further the content items may also include multimedia data items accessible at any time. For example, the content items may include video data accessible on demand by a user, e.g. in a "video on demand" system. In addition, the content items may include program events that have been broadcast in the past and that have been stored by "catch up" servers, e.g. on the internet, allowing to download the program event as "catch up television". The content items may be restricted to multimedia data items stored within a predetermined period of the past, e.g. not earlier than a predetermined threshold time.

The content items may also include further multimedia data, such as images, audio/video data (in files or streams), textual data and/or executable applications, such as video games or widgets/gadgets/applets, i.e. small applications to be run within a predefined environment, enabling user interaction and data access e.g. via a network such as the internet. For example, when a documentary film about Paris is being watched, then a weather widget may be proposed as a further content item for automatically loading information about the weather in Paris.

Additionally, non-video content items may be included in the content items, such as still images, textual data or non video executable applications.

Further networks, such as the internet, may also allow access to content items, as described in the above.

These various and further information sources may be taken into account when providing the first set of content items at B100, such that all these information sources may be taken into account when providing the first set of content items.

Since the first set of content items may be received from a remotely located server, the first set of content items may include content items which may be accessed at remote information sources. Therefore, the content items of the first set will in the following be referred to as remote content items.

For each content item of the first set received at B100, linking information linking each of the content items of the first set to a respective subset (first subset) of the first set may be received at the television apparatus.

If the first set includes remote content, as described in the above, the linking may be understood as a recommendation of remote content. The linking may for example allow recommending all content items of the first set linked to a certain content item if a user is interested in the certain content item. Thereby, all content items included in the respective subset may be considered as recommended to the user interested in the certain content item. The respective subset may therefore also be referred to as remote recommendation subset.

The linking may be provided for allowing an access from the certain content item to the content items included in the respective subset. The linking may link the certain content item directly to single content items in the respective first set, or may link the certain content item to a description of the respective first set as a whole. The linking may for example be given by means of pointers, indicating logical or physical storage addresses of elements of the respective subset, or may be defined by a (logical) query providing access to the whole subset.

For determining the first set of content items (remote content items) and the linking information (recommendation information of remote content items) indicating the recommended respective first sets of content items, various methods may be used. For example, the first set of content items and the linking information may be determined at a server providing recommendation for electronic program guide data.

At the server, the subset of a certain content item of the first set may be determined e.g. based on comparing the meta data of a content item with the meta data of all other content items. The subset (first subset, remote recommendation subset) for the certain content item may for example be determined only by comparing the meta data of the certain content item with the meta data of all other content items of the first set.

When comparing the meta data of the certain content item to meta data of all other content items of the first set, any kind of data comparison and any kind of comparing algorithm may be applied. For example, a textual comparison based on various fields of the meta data may be performed. Further, also exact matches of words within the meta data of the certain content item and the meta data of another content item may be taken into consideration. Further, images (still images or video clips) associated with the content item as meta data may be used for the determining of the respective subset. For example, images with similar colour properties may be identified as related meta data. More generally, feature vector techniques may be used in which the metadata (images or textual metadata) is represented by feature vectors, and Euclidean distances can be calculated between feature vectors for content items to identify closely linked or related content items.

A quality of match between the meta data of the certain content item and the meta data of another content item may be determined or quantified, e.g. by a score of match. The quality of match, e.g. score of match, may be transmitted to the television apparatus with the first set and the linking information, for example as an attribute of a respective link.

Based on the results of comparison, all content items which are judged to be best matching the certain content item may be included in the subset of the certain content item. For example, all content items with a quality of match (score of match) higher than a given threshold may be included. Alternatively, a predetermined number of content items best matching the certain content item may be included. Further alternatively or additionally, content items with their meta data including keywords exactly matching to keyword in the meta data of the certain content item may be included.

Thus, for each content item of the first set (remote content), a subset of the first set of content items (remote recommendation subset) is transmitted to the television apparatus, which first subset includes all content items of the first set with meta data matching the meta data of the certain content item, e.g. attaining a predetermined score of match.

At B102, a second set of further content items locally available at the television apparatus is provided. The second set may therefore be regarded as local content or personal data of the user. The second set may include content items locally available, e.g. stored in a local storage of the television apparatus, in a connected storage device accessible e.g. via home network, on a data carrier inserted into a local reading device, on a memory Stick™ and/or on any other storage device within a sphere of responsibility of the user. For example, content items of the second set may also be stored on a server accessible via a network, but assigned to the user, such as a personal video recorder stored within the network. Even though the network based personal video recorder may not be stored locally, but on a remote server, its content may be regarded as local content, i.e. as not forming part of the first set of content items considered at the server. The second set (local content) may therefore be regarded as a personal, private content of the user.

The second set may include program events recorded from the broadcast signal, from catch-up TV or from a video on demand system. Further, the second set may also include non-video content items, such as still images, textual data or executable applications stored by the user.

The content items of the second set locally available, e.g. stored in a sphere of responsibility of the user, may have been received via broadcast signal, via network access e.g. over the internet to further servers, and/or may have been generated or provided by the user. For example, the content items may comprise personally captured images or video sequences recorded by a user's pickup device. Further, the second set may comprise a personal video collection of the user, e.g. purchased by the user and stored so as to be accessible from the television apparatus.

At B104, further linking information is determined for each content item in a unified set including the first and second sets, i.e. the local and the remote content. The unified set may therefore be regarded as the union of the first and second set, including all content items of the first and of the second set. Therefore, the unified set comprises all items of local and remote content. For each content item in the unified set, the linking information may establish a link to a further subset (second subset, local and remote recommendation subset) from the unified set.

As the linking information, the further linking information may be given by means of pointers, indicating logical or physical storage addresses of elements of the respective subset, or may be defined by a (logical) query providing access to the whole subset. It may for example be advantageous to implement the further linking information in a similar way as the linking information.

As the linking information, the further linking information with respect to a certain content item may also allow recommending all content items of the further subset (second subset, local and remote recommendation subset) to the user interested in the certain content item. Thereby, all content items included in the respective further subset may be considered as recommended to a user interested in the certain content item.

It is to be noted that by the further linking information, each content item of the unified set is linked to a subset of the unified set including the remote as well as the local content. The recommendation provided by the further linking information may therefore be regarded as augmented or complemented by local recommendations.

For example, for a certain content item of the first set, the further subset may be determined by adding content items or the second set (local content) to the subset of the certain content item. This may be advantageous since to the first linking information received, additional links may be added. Consequently, the processing power needed at the television apparatus may be significantly reduced.

It may further be possible to delete one or several content items of the initial subset, e.g. for replacing them by the content items added from the second set.

The content items added may be determined by comparing meta data associated with the certain content item with meta data respectively associated with content items of the second set. In this comparison process, all content items of the second set may be regarded, i.e. the meta data of the certain content item may be compared to the meta data of all content items of the second set. It is further possible to determine the content items to be added only by comparing the respective meta data. For retrieving meta data associated with content items of the second set (local content items), further remote sources like the meta data servers provided by Gracenote™ may be accessed, e.g. for retrieving meta data based on feature vectors of the content items, as will be explained in more detail below.

For the comparison, any kind of data comparison and any kind of comparing algorithm may be applied. As described in the above, a textual comparison based on various fields of the meta data may, for example, be performed. Further, also exact matches of keywords within the meta data of the certain content item and the meta data of the content item may be taken into consideration. Further, images (still images or video clips) associated with the content item as meta data may be compared in view of their feature vectors or color properties. Further, for images or textual meta data, feature vector comparison techniques, e.g. based on an Euclidean distance may be used for identifying closely linked or related content items.

When determining the content items to be added to the further subset of the certain content item, for each of the content items of the second set (local content items) the quality of match with the certain content item may be determined, e.g. by calculating a score of match indicating a goodness of fit of the meta data associated with a respective content item of the second set with the meta data associated with the certain content item, i.e. a score indicating how good the fit of the meta data associated with a respective content item of the second set with the meta data associated with the certain content item is. In other words, the score of match may reflect a closeness and/or distance between the certain content item and the content items locally available, which closeness may be determined based on a comparison of the meta data.

The local content items to be added to the further subset of the certain content items may be determined in view of the quality of match or score of match. For example, the score of match may be compared to a threshold. The local content item may be added to the further subset of the certain content item only if the score of match is, for example, higher than the threshold. The threshold may be predetermined or defined in view of a score of match attained by the content items of the subset, i.e. of the scores attained by the previously computed recommendations of remote content. For example, a local content item may only be added to the further subset if its score of match is higher than a score of match of any of the remote content items recommended for the certain content item. In this case, the local content item may replace the remote content item, or it may be inserted into a sorted list at a position preceding the remote content item.

By comparing and sorting the local and remote content items in accordance with the score of match, a list of the best matching content items with respect to a predetermined threshold, or a predetermined number of best matching content items may be determined as the further subset.

To allow the comparison of the scores of match for the certain content item with local and remote content items, the score of match may be determined in a corresponding manner, thereby attaining comparable results.

Moreover, e.g. for content items of the second set, the meta data may also include a ranking of the user. For example, it may be supposed that a user assigns a high rank to his local content items because he likes it, since otherwise he would not have recorded or purchased it. The ranking may be analyzed when determining the quality of match or score of match. The user's ranking may, for example, be used as a weighting for the comparison of the score of match. Consequently, the further subset (second subset, local and remote recommendation subset) for the certain content items of the unified set may be determined by analyzing the ranking.

When using same or similar match criteria when comparing the meta data for determining the further subset (second subset, local and remote content recommendation subset) at B104 that have already been used for determining the respective subset received at B100, it may be achieved that recommendations are prioritized by comparable criteria. It is further possible to use corresponding, but simpler match criteria, thereby obtaining a simplified comparison algorithm that may be adapted to be run and determine in a short time at the television apparatus. Simplified criteria may be determined e.g. in view of runtime restrictions at the local television apparatus. For example, the process of comparing meta data may be restricted to certain, predefined fields of the meta data, or may be restricted to local content items of a high rank.

This allows an efficient integration of recommendations of local content into a recommendation list provided by remote server.

Consequently, network delivered content and content available locally may seamlessly be integrated into a recommendation system for an end-user. This may be supported by providing linking data between a remote server providing recommendation databases and a local recommendation infrastructure. All processing steps necessary for providing linking information related to remote recommendations may be performed at the remote server (or server cluster), which may be equipped with a large amount of storage and processing power for supporting the processing. Consequently, only the integration of the recommendations of local content may be performed at the end user side, so that the processing steps to be performed locally may be restricted to a small amount, thereby avoiding heavy processing at the end user side.

In an embodiment of the method, the further subset (local and remote recommendation subset) for each content item in the unified set may be determined when additional content items are added to the second set. In other words, an update of the recommendation links (further linking information) may be performed when further local content is accessible at the television apparatus.

For example, when the user plugs a flash stick or memory Stick™ into the television apparatus or a connected reading device, or when the hard disk connected to a local network is powered on, or when the data carrier is inserted into a reading device, the second of content items (local content items) may be considered as updated, and the further linking information may be re-calculated as described at B104. Thereby, the further linking information may be updated in view of the newly included local content.

When updating the further linking information, only the newly included local content may be considered. It may therefore be sufficient to compare the meta data of the content items of the unified set to the meta data of only the newly included local content items, thereby saving processing power and processing time.

If further linking information is updated any time the local content is changed, it may be guaranteed that the overall, i.e. local and remote recommendations are constantly updated.

It is further possible to determine the further subset for each content item in this unified set when the first set of content items and the linking information relating the content items to the respective subsets is received from the server. This allows providing a complete recommendation including remote and local content every time the remote content recommendations are received at the television apparatus.

Figure 2:
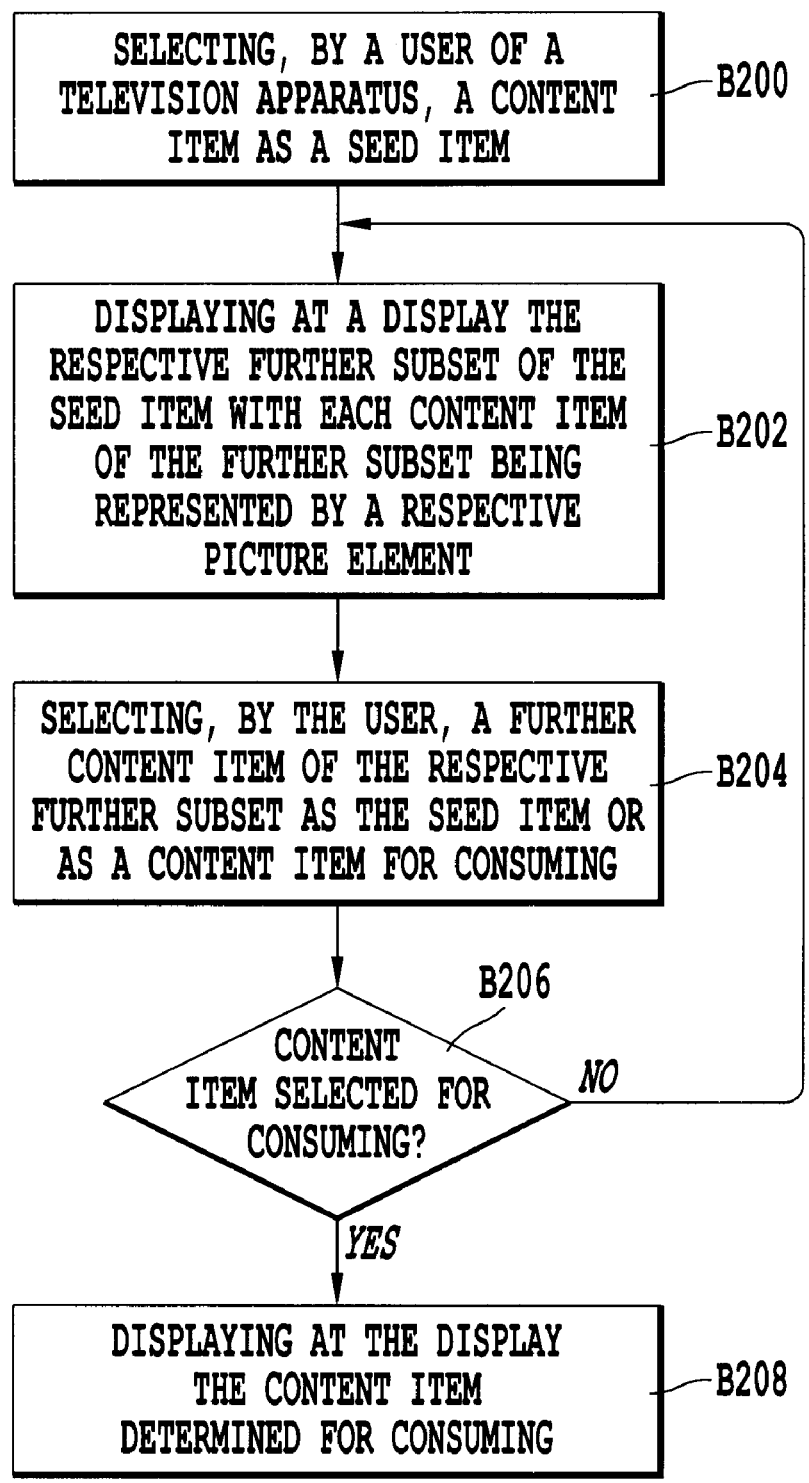
FIG. 2 illustrates a further embodiment of a method of recommending local and remote content based on an iterative selection of a content item for consuming.

FIG. 2 illustrates a further embodiment of a method of recommending local and remote content. In the embodiment, an iterative selection of a content item for consuming is performed. As a basis for the selection, the further linking information including remote and local recommendations is used.

At B200, one of the content items of the unified set of content items, including the local and remote content, may be selected as a seed item by a user of a television apparatus. For example, the seed item may correspond to a content item that the user currently consumes, e.g. is watching on his or her television apparatus. Alternatively, the seed item may correspond to a content item the user has been watching in the past. Further alternatively, the seed item may also be automatically generated, e.g. based on the user profile reflecting the preferences of the user, or based on a mood of the user that may be determined based on keywords uttered by a user and detected by a speech detection apparatus. Further, the seed item may also be determined based on a user feedback of the user, rating content of content items in accordance with a user's personal taste, the feedback having been entered during watching or navigation activities of the user e.g. by use of a remote control of the television apparatus. As a further alternative, the seed item may also be entered directly, e.g. by a text or speech of the user. A text input may for example be entered via an onscreen keyboard operated by the remote control.

Based on the seed item, an iterative process for determining a content item for consuming according to a user's wish may be executed. The iterative process is based on a repetition of steps of the process, wherein the steps are repeated e.g. until a predetermined condition holds. In this case, the condition corresponds to the selection of the content item for consuming by the user. In other words, the iterative process allows the user to select, within the unified set of remote and local content items, a content item he or she desires to consume, i.e. a content item of particular interest for him or her. For example, the content item for consuming may be a program event the user desires to view or record, a textual information the user desires to read, or an interactive application, e.g. video game, the user desires to run.

It should be noted that a program event that has occurred in the past as a scheduled broadcast can be used as a seed item to find related content items, irrespective of whether or not that content item is available on demand over the internet or indeed as a later scheduled repeat.

In some embodiments, it is proposed, for the user's convenience, to provide an electronic program guide in which available content items are displayed as representative images and include currently broadcast program events which the user can select to initiate a channel change, past scheduled events which the user can select to initiate on demand retrieval and playback and future scheduled broadcasts which a user can select for later recording, all of which types are displayed concurrently on screen and being related to seed item(s) chosen by a user. Further, locally available content items may be included into the electronic program guide data, e.g. if recommended by the further linking information. Additional metadata for one or more content items may also be displayed concurrently.

At B202, within the iterative process, the respective further subset of the seed item selected by the user may be presented to the user, e.g. may be displayed at a display of the television apparatus. As explained in the above, the further subset may comprise remote and local content items.

The content items of the further subset or at least a part of the content items of the further subset may be represented as images, e.g. key frames or representative keystamps or thumbnails representing content items. The images may be still or moving images. Alternatively, the images may correspond to a logo representing the program event, its genre (e.g. horror thriller, tennis, UEFA Cup™) and/or the transmitting television channel (BBC 1™). This allows providing a graphical representation of the further subset related to the seed item. The graphical representation may form a graphical user interface, providing an overview of the further subset of recommended content to the user.

The graphical representation of the further subset thereby may be part of a graphical user interface allowing the user to get a quick overview on the content of the further subset and to easily navigate through the further subset, e.g. for exploring the content of the further subset or for selecting, as illustrated at B204, a further content item of the unified set, including remote and local content recommended in relation to the seed item, as the seed item for the next step of iteration or as the content item for consuming.

As illustrated at B206, the iterative process of selecting the seed item and displaying the respective further subset may be repeated until a content item is selected for consuming.

When a content item for consuming has been selected by the user, the content item is displayed to the user at the display, as illustrated at B208. For example, if the content item selected is available for immediate consumption, e.g. since it is stored locally, accessible via network or currently broadcast by a television channel, display of the content item may start immediately. Otherwise, if the content item selected for consuming is scheduled for broadcast in the future, it may be scheduled for recording or may be included in a personal watch list.

The iterative process of selecting a seed item and displaying the respective further subset of the seed item, allows a quick and efficient navigation from the first seed item to further local and remote content items which may be of interest for the user. Even though a large number of content items of various information sources, including the local storage storing personal data of the user, may be included in the set of content items, the process allows navigating step by step through content items of interest, until a content item desired for consuming is identified. Thereby, a quick and easy to use navigation through an enormous amount of television channels, program events, video on demand items, non-video items and locally available content can be achieved, e.g. in an electronic program guide including broadcast channels, internet TV and further information sources such as the local storage in a unified approach.

As an alternative to the iterative selection of the content item for consuming illustrated in FIG. 2, also a recursive approach may be chosen. For determining the content item for consuming to be selected by the user of the television apparatus recursively, i.e. by a recursive process, the seed item may be selected by the user as described in the above. Then, a recursive selection may be performed until one of the content items of the unified set including local and remote content items is determined as the content item for consuming. The recursive process may be defined by steps, the steps being applied within their own definition, the steps being therefore carried out in a self-similar way. For example, the user may select a further content item of the respective further subset as a further seed item for a further recursive call of a process corresponding to B202, or alternatively as the content item for consuming. If a new seed item has been selected, a further recursive call of the recursive process, based on the new seed item, may be issued. Otherwise, the recursive process may terminate. After termination, the content item selected for consuming may displayed to the user, as explained in the above.

As the iterative determination of the content item for consuming within the set of content items, the recursive determination also allows to quickly navigate from the first seed item to local and remote content items that may be of interest for the user until a content item for consumption is determined. This allows a smart navigation through the large amount of content items from various information sources, including broadcast channels, internet television, video on demand and locally available content according to the interests of the user.

Figure 3:
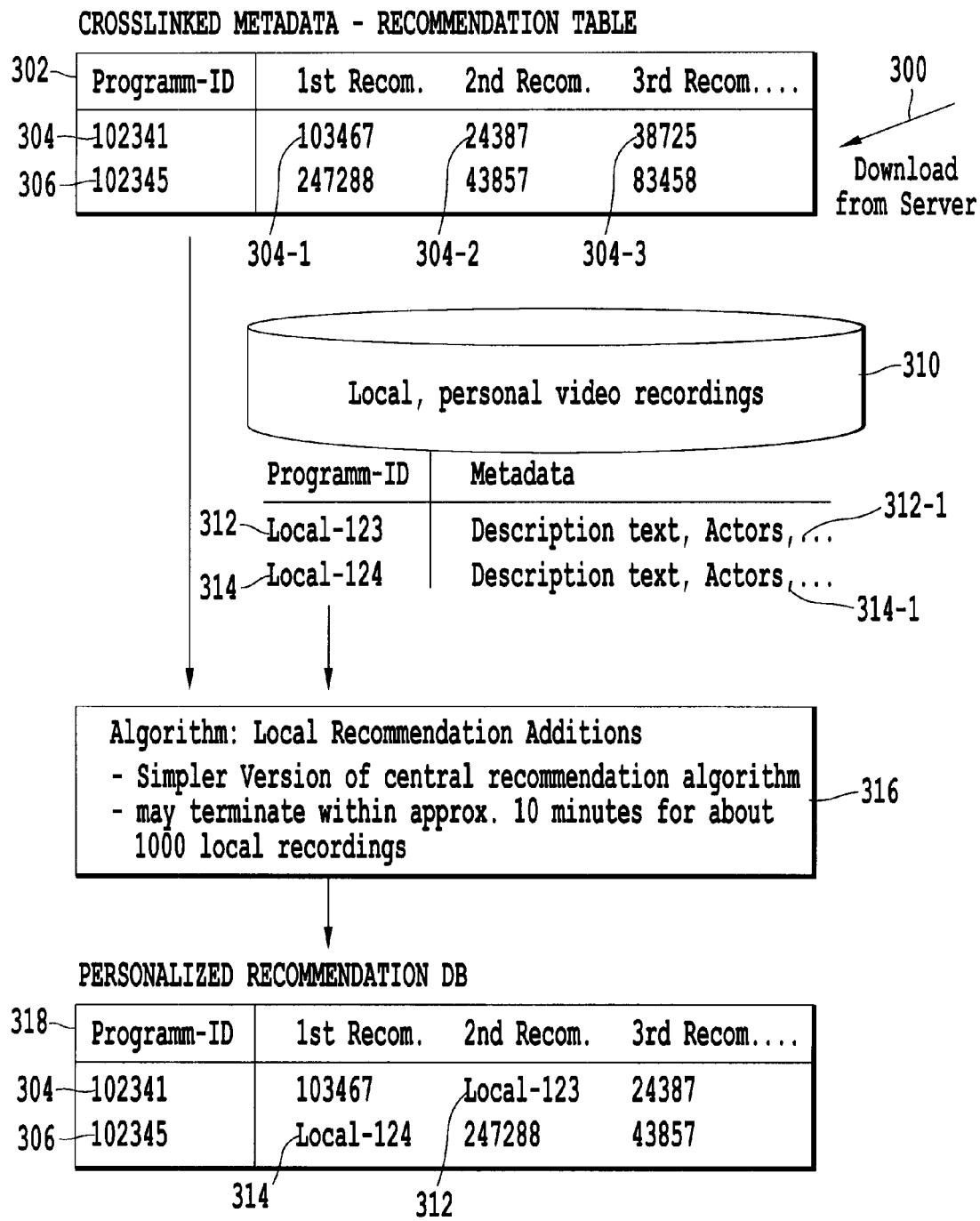
FIG. 3 illustrates an embodiment of a method for generating a personalized recommendation table including local and remote content.

FIG. 3 illustrates an embodiment of a method for generating a personalized recommendation table including local and remote content.

In the embodiment a back end system comprising a server or a server cluster with controller software, hard disks and local memory, which is connected to a network, such as the internet, includes a network side meta data and information database. The server may maintain an online connection to a plurality of television apparatuses and receiving devices which may have subscribed to a service of content recommendation and/or electronic program guide data provision. A network side application residing at the server may include a recommendation engine and a network link generator generating new cross-linked meta data download files. The cross-linked meta data download file may include the first set of content items (remote content items) being cross-linked by the linking information (Remote recommendations). The linking information thereby links each of the (remote) content items to a respective subset including further (remote) content items.

The cross-linked meta data download file may be generated periodically, e.g. daily, and sent to the subscribers.

In FIG. 3, first arrow 300 illustrates the download of a cross-liked meta data recommendation table 302 from the server. In the example, the content items included in cross-linked meta data recommendation table 302 are identified by a unique identification number, e.g. by first and second unique identification numbers 304 and 306. For each content item, several recommendations may be included in cross-link meta data recommendation table 302. For example, for the content item identified by first unique identification number 304, a first, second, and third recommendation identified respectively by further unique identification numbers 304-1, 304-2, and 304-3 are given. Accordingly, all computed recommendations of remote content from the network link generator may be included in cross-linked meta data recommendation table 302. In the example, the content items identified by first and second unique identification numbers 304 and 306 form the first set of content items.

Further unique identification numbers 304-1, 304-2, and 304-3 establish links linking the content item identified by first unique identification number 304 to the content items to the remote recommendations. These links (linking information) may also include further information, e.g. a logical or physical address of the recommended content items or of meta data related to the recommended content item. The links may for example include an URI (unified resource identifier) identifying a location of the recommended content.

Further information may also be included with the links, such as a score of match indicating the closeness of match achieved when comparing the meta data of the respective content items.

Even though cross-linked meta data recommendation table 302 has being determined centrally at the server, it may however be customized for each receiving television apparatus, e.g. if having subscribed to a personalized download service. Therefore, a download configuration may be stored at the server, in which settings for the download may be stored. The television apparatuses may accordingly get customized download files, e.g. according to a local channel line up, to a user profile descriptive of a personal taste of a user of a television apparatus, or to a device profile depending, for example, on a type of the television apparatus, or on a hardware profile or hardware characteristics of the television apparatus. The settings may further configure a forward looking program schedule, thereby influencing significantly the size of cross-linked meta data recommendation table 302. For example, several days up to one month in advance are typical values for the program schedule information load.

At the user side, the television apparatus receives cross-linked meta data recommendation table 302. Since further content is available locally, e.g. from a local storage 310 of the television apparatus, there is a need for updating cross-linked meta data recommendation table with the locally available content.

In the example, two locally available content items are identified by the second and third unique identification numbers 312, 314. These content items may be stored in connection with meta data 312-1, 314-1. The locally available content items identified by the second and third unique identification numbers 312, 314 form the second set of further content items.

In the embodiment, a local application 316 may perform an algorithm merging the locally available content into cross-linked meta data recommendation table 302, thereby including local recommendation additions.

The algorithm may by a simpler version of the algorithm performed at the central server for generating cross-linked meta data recommendation table 302. For example, the algorithm may terminate within a predetermined period of time, e.g. within approximately ten minutes when including about 1000 local recordings, even though processing capabilities at the television apparatus may be restricted. This may be achieved by a smart configuration of the algorithm, as will be explained in the following.

When including local recommendation additions in cross-linked meta data recommendation table 302, for each content item of the first and second set (content items referenced in cross-linked meta data recommendation table 302 and content items available locally, e.g. from local storage 310), the related content items should be identified. Thereby, for each content item of the unified set including the first and second sets, further linking information linking the content item to a respective further subset of the unified set of local and remote content may be determined.

Since it may be assumed that the meta data of all content items of the remote content has been compared at the server side at a time of generation of cross-linked meta data recommendation table 302, it may be sufficient to only compare the meta data of content items included in cross-linked meta recommendation table 302 (remote content items) to the meta data of content items available locally (local content items). The meta data of a certain remote content item may for example be compared to meta data respectively associated with all local content items.

For comparing the meta data, any kind of data comparison at any kind of a comparing algorithm may be applied, as described in the above. However, it may be suitable to use a same or similar comparing method as used when generating cross-linked meta data recommendation table 302. In this case, a quality of match between the meta data of the certain remote content item and the meta data of another local content item may be determined or quantified, e.g. with a further score of match. The further score of match may be calculated in similar way as the score of match calculated for remote content items, thereby resulting in a comparable score. In this case, the score of match calculated by local application 316 may be compared to the score of match between the remote content items, which may have been transmitted e.g. in association with the links (linking information).

Based on the result of comparison of meta data and/or on the score of match, the local content items to be added may be determined. For example, for a certain remote content item, all local content items having a score of match higher than a predetermined threshold may be included in a personalized recommendation data base 318. Alternatively, the predetermined number of the local and remote content items with best matches, e.g. of ten best matching content items, may be included in personalized recommendation data base 318. Thereby, remote content items with a lower score of match may be excluded from the further subset, e.g. from the recommendations linked to the certain remote content item in the personalized recommendation data base. Further, the recommendations included in personalized recommendation database 318 may be sorted in accordance with the score of match, e.g. in a descending order.

In the example, personalized recommendation database 318 has been updated with the local content by inserting third unique identification number 312 into a first row of personalized recommendation database 318, and by inserting fourth unique identification number 314 into a second row of personalized recommendation database 318. As a result, the respective local content items will be recommended to a user having selected the remote content items identified by first and second unique identification numbers 304 and 306.

Figure 4A:
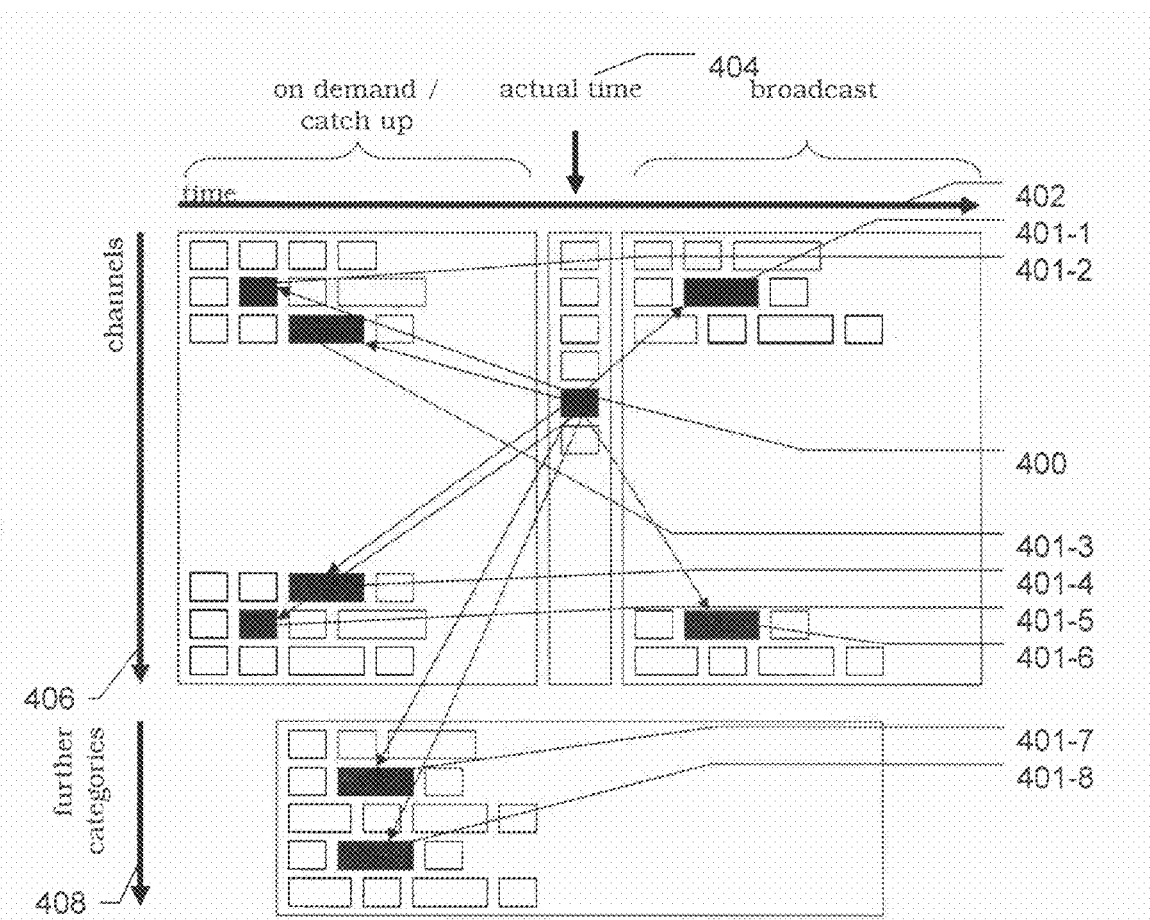
FIG. 4a illustrates determination of a subset of content items related to a given content item in an embodiment of the method.
Figure 4B:
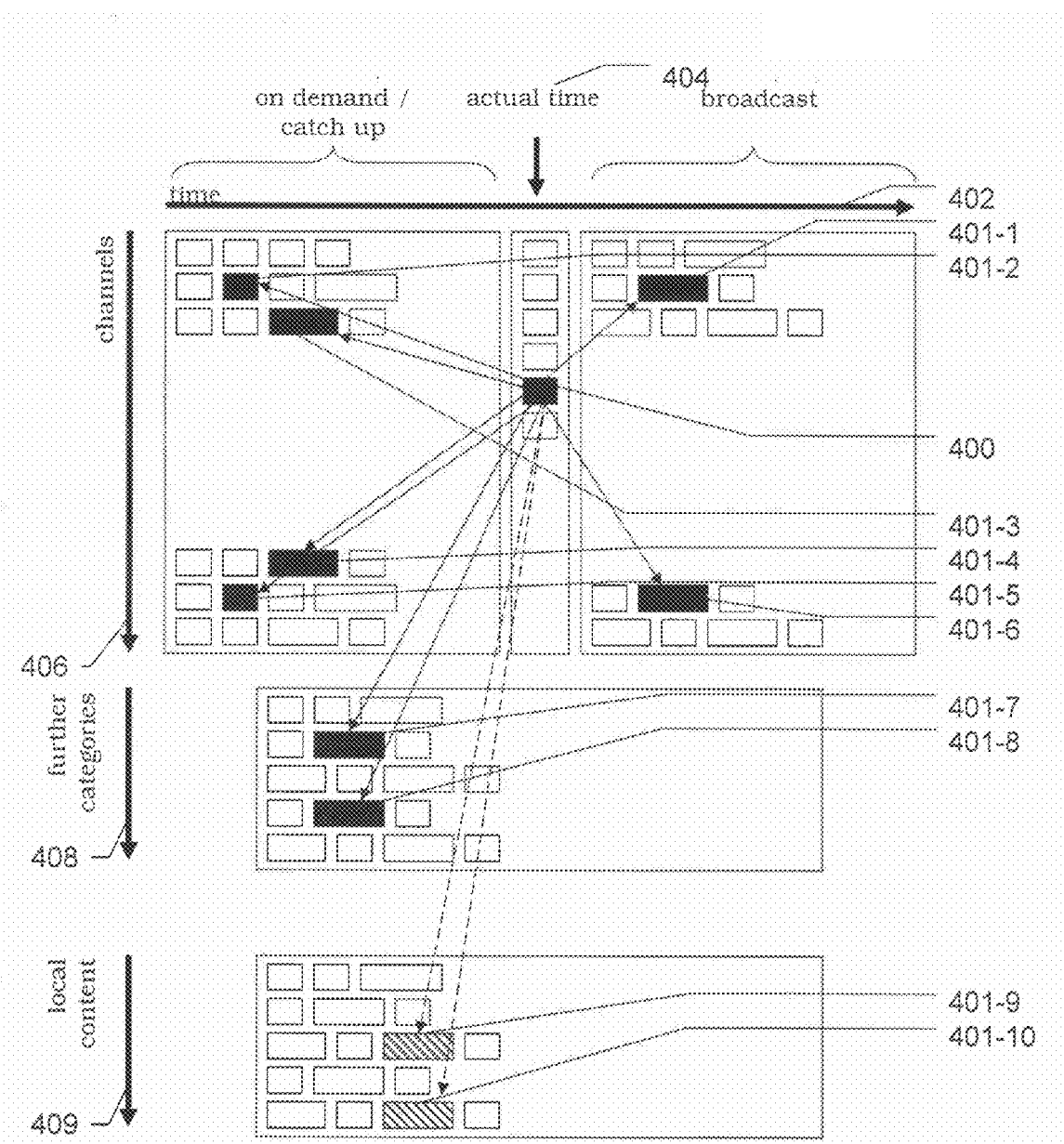
Figure 4C:
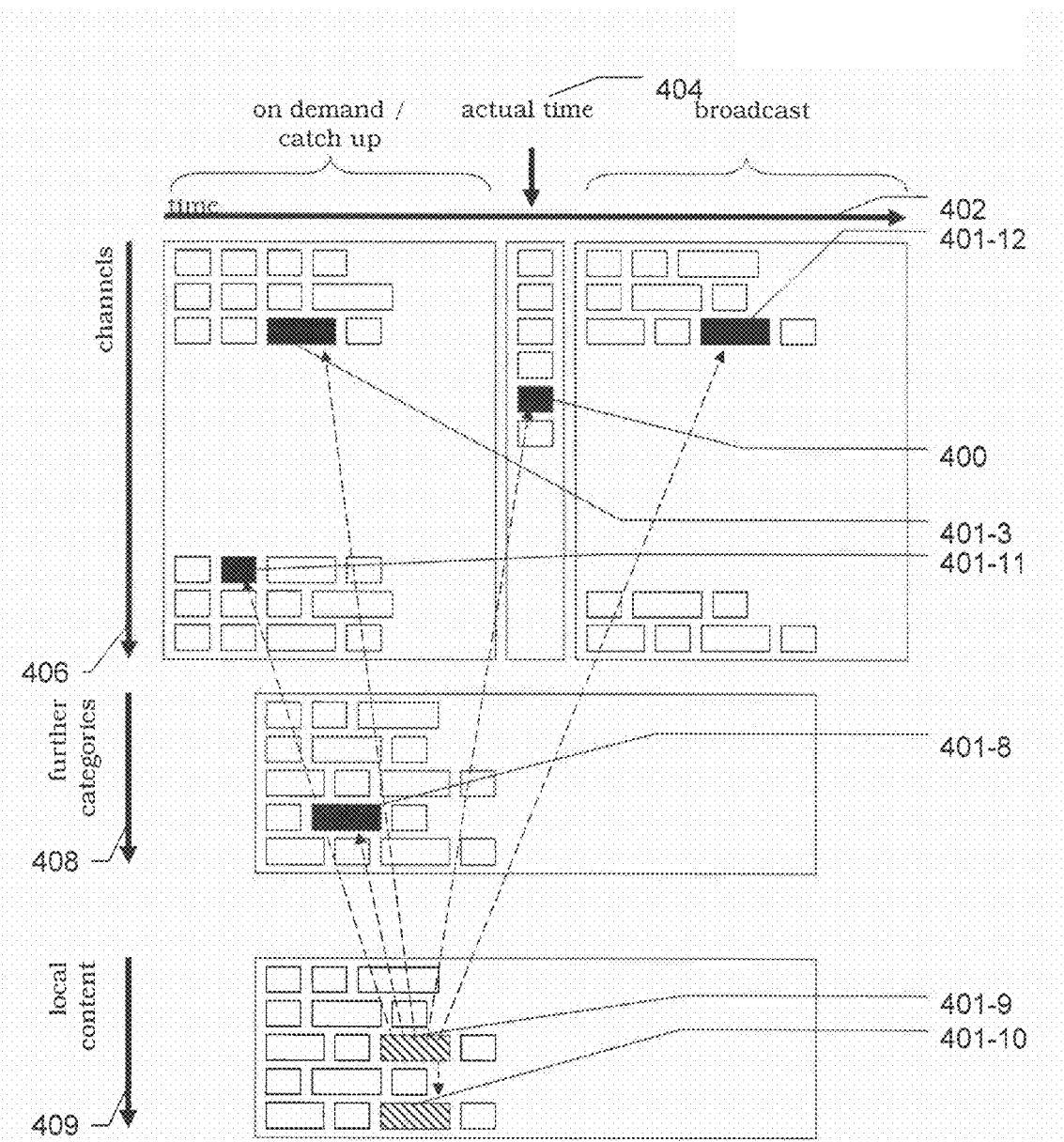
FIG. 4c illustrates determination of a further subset of content items for locally available content items in the embodiment of FIGS. 4a and 4b.

In FIG. 4*a* to *c*, the determination of the linking information and of the further linking information in a further embodiment of the method is illustrated with respect to a content item 400.

In FIG. 4*a*, determination of the linking information linking the remote content is illustrated. This step may be performed at the server.

For giving an overview on different types of content items being linked, the set of content items is grouped in accordance with the types and/or information sources of the content items included in the set. Time axis 402 illustrates a period of time which may be fixed for determining and/or selecting the content items of the set from a large amount of content items available. Departing from an actual time, indicated by actual time arrow 404, the period of time may extend several days, weeks or months to the past and several days, weeks or months to the future. The extension of the period of time may depend upon a temporal scope within the embodiment. Several days up to one month in advance may be a typical scope of, for example, an electronic program guide in order to cover all broadcast events scheduled for this period of time. Further, the period of time may extend between two to four weeks to the past for including all video on demand or catch up events stored for this period. Such video on demand or catch up events may be provided for download on a video streaming server of a content provider, such as a broadcaster like BBC. This can be a free service or subject to charges of the user. The system may further offer more or less content than available on the internet, e.g. due to special agreements with the content provider. The temporal scope may be set in accordance with a user's wish or in accordance with a device setting such as a storage capacity of the user's television apparatus.

As indicated with the channels arrow 406, the content items may be related to different television channels, e.g. including broadcast channels and other channels, such as internet television. Due to the various information sources and broadcasts, the number of channels may be large (for example, in Germany, about 100 broadcast channels, 700 online information sources and 150 sources of catch-up television are available, such that about 1000 channels may be included in the set of content items).

In addition, further content items from further categories may be included in the set of content items, as indicated with further categories arrow 408. These categories may include promotional services, information providers, e.g. providing latest news or stock exchange data, or articles repurposed from print media and made available over the internet. Further categories related to persons of interest (actors, politicians, sportsmen, celebrities . . . ), cities, countries, sports clubs, organizations and Companies may be given, as will be explained in more detail below.

In the case depicted, the user watches a program event represented by content item 400, to which he desires to gather more information. Content item 400 is therefore considered as being the seed item, e.g. for performing the process depicted in FIG. 2.

For performing the process, the respective subset of content item 400, is to be identified, e.g. based on comparing the meta data of content item 400 to the meta data of all other content items of the set, as explained in the above for B100 of FIG. 1. In the case depicted, the content items 401-1, . . . , 401-8 of the subset of program event 400 are marked in black and are linked to content item 400 by arrows. The arrows may represent the linking information, linking content item 400 to the items included in its respective subset.

As becomes clear from the overview of FIG. 4*a*, actual and future broadcasted content items and content items from the further categories may be displayed in a single overview.

In FIG. 4*b*, the providing of the second set of further content items, i.e. content items available locally at the television apparatus, is illustrated, as indicated with a local content arrow 409. The local content items may include all kinds of content items that may be stored in a sphere of responsibility of the user, as described in the above.

In the example, the linking information linking content item 400 to its respective subset of the first set (first subset, remote recommendation subset), as illustrated in FIG. 4*a*, is completed by adding further linking information linking content item 400 to local content items 401-9 and 401-10. The further linking information may have been determined as illustrated at B104 of FIG. 1. Local content items 401-9, 401-10 linked to content item 400 by the further linking information may therefore be considered as being added to the respective subset of content item 400 (remote recommendation subset). Consequently, the further subset (second subset, local and remote recommendation subset) of content item 400 additionally comprises local content items 401-9, 401-10.

Further, the further linking information may also be determined for local content, e.g. for local content item 401-9, as illustrated in FIG. 4*c*. In the example, local content item 401-9 is linked to content items 400, 401-12, 401-3, 401-11, and 401-8. Further, it may be linked to other local content items, such as local content item 401-10.

Figure 5A:
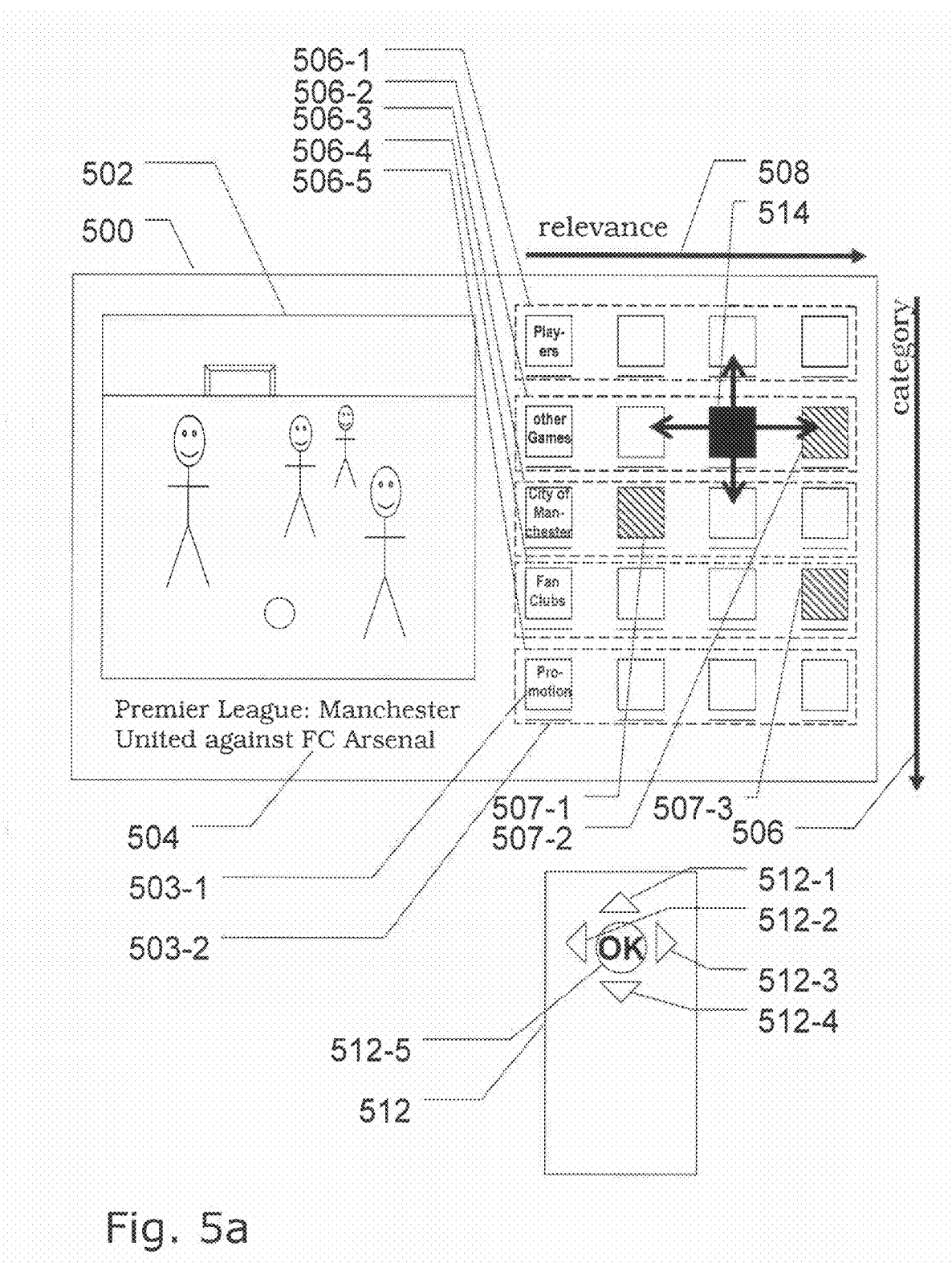
FIG. 5a illustrates a further embodiment of the method of recommending local and remote content with respect to a user's selection.

In FIG. 5*a*, it may be assumed that the user is watching a football game, such as Manchester United against Arsenal FC. This football game may, for example, correspond to content item 400 of FIG. 4.

When initiating the method of recommending local and remote content, e.g. by calling an electronic program guide upon a button click of the remote control, the display 500 may be re-organized as follows. In a viewing window 502, content item 400 may be shrunk to the left half of display 500, but continued to be displayed. Further, additional information, e.g. from the meta data of the content item displayed in viewing window 502, may be displayed in a meta data section 504.

The content items linked to the content item displayed at the viewing window 502, e.g. by the further linking information, may be displayed in a further section of the graphical user interface, occupying for example the right half of display 500. In this section, the content items of the further subset, including local and remote content, may be displayed by images and may be arranged such that the user gets a quick overview on the items display. For each content item of the further subset, an image 503-1 and a textural representation 503-2, e.g. taken from its meta data, may be presented.

The further subset of content items related to the content item displayed at the viewing window 502 may be grouped by categories, as illustrated by a category arrow 506. For example, the content items may be arranged in rows according to categories 506-1, 506-2, 506-3, 506-4 and 506-5. The category of a certain content item may be determined by analyzing the meta data associated with the certain content item, e.g. may correspond to keywords in the meta data of the certain content item. As will be discussed below with FIGS. 8 and 9, these keywords may be identified within the meta data by comparing the meta data with predetermined data, e.g. including information of public contemporary interest. For example, the data including information of public, e.g. contemporary, interest may be provided within a database, such as the information databases illustrated in FIG. 8 and discussed below.

The categories may be displayed in a manner structuring the graphical user interface. For example, they may be displayed e.g. in a first column of rows arranging the subset of content items, as illustrated in FIG. 5*a*. The categories may be identified or indicated by a textual or graphical representation. In case that a keyword identified with referral to the database are used as categories, an icon or image from the database associated with the keyword may be used as the representation.

For the seed item of a "Manchester United" football match, as depicted on FIG. 5*a*, there may be a category 506-1 of content items related to Manchester United players like Wayne Rooney, a second category 506-2 of other Manchester United content, such as further Manchester United games, a third category 506-3 related to Manchester, the town, a forth category 506-4 related to Fan Clubs of Manchester United, and a fifth category 506-5 promoting fan articles available for shopping.

Local content items may be displayed in a certain category indicated as "local", or may also be included in the categories indicated by the respective meta data. In the example, local content items 507-1, 507-2, and 507-3 are represented as diagonally striped and are included in categories 506-2, 506-3, and 506-4, respectively, depending on their meta data.

Further, the content items may be ordered depending on their relevance, as illustrated by a relevance arrow 508. For this ordering, the quality of match, the score of match, the user's ranking and/or a user profile descriptive of the user's personal tastes may be taken into consideration.

In the case depicted, it may be supposed that the meta data of the seed item displayed in viewing window 502 contains a keyword Manchester and a genre sport. Keyword Manchester may be identified as a city and as a football team. As categories within the subset, sports related content items, such as content items related to the team and to players, may be included, as well as documentary content items and travel-related content items related to the city of Manchester. Further, promotional content items offering fan articles and internet content items providing access to personal web pages of the players may be included.

Within the subset displayed, the user may navigate through the content items e.g. by use of his remote control 512, by speech, or by a further input device. When using a remote control, navigation keys 512-1 to 512-4 may be provided for marking images and skipping horizontally and vertically through the content items arranged on the, e.g. two-dimensional, display surface. Alternatively or in addition, further navigation keys may be provided for zooming in and out of a marked item, thereby providing access to a 3-dimensional arrangement or a 3-dimensional linking of the content items displayed. Further, at least one confirmation key 512-5 may be provided for selecting a marked image.

In the example, content item 514 is marked, and navigation keys 512-1 to 512-4 may be used for skipping upwards, to the left, to the right or downwards, respectively, for marking a neighboring content item of the subset. Once a content item of interest is reached within the subset, the user may operate confirmation key 512-5 for selecting the content item as a further seed item.

The navigation within the graphical user interface, displaying the subset related to the seed item graphically, allows a quick and easy to use selection of the further seed item with only very few and simple user interactions. The selection may be carried out using a remote control with very few keys or by uttering intuitive speech commands.

To allow a quick overview supporting the user's selection, the size of the respective further subset of content items displayed at the display may be adapted to a display capacity of the display. For example, when using mobile devices having only a small display, only very few items may be displayed on the graphical user interface. However, when skipping vertically or horizontally, further items may be included (e.g. on a right or lower edge of display 500), while other items may be excluded or hidden. When, however, using a large display, more items may be displayed. The number of items displayed may be determined by a user's setting, or may automatically be adapted to a human cognitive reception capacity. For example, the content items may be arranged in a table with four or five rows and four or five columns. It is expected that no matter how large the screen, displaying hundreds of content items to select from at the same time might overwhelm a user.

Figure 5B:
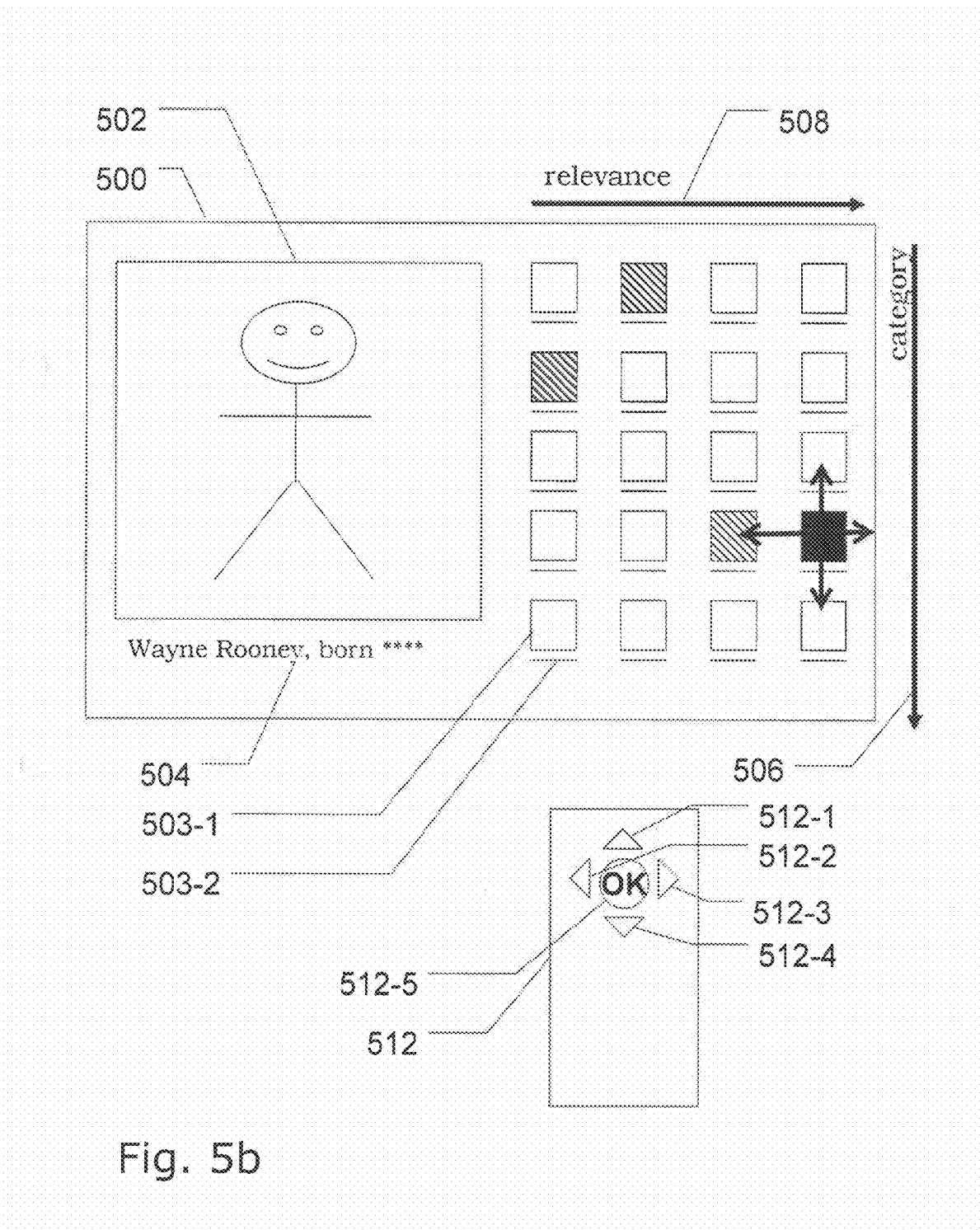

After having selected a further content item as the seed item (as described at B204 of FIG. 2), e.g. by pushing confirmation key 512-5, the graphical user interface may be updated as shown in FIG. 5*b*. In the case depicted, it is to be assumed that one of the players of Manchester United, Wayne Rooney, has been selected. In viewing window 502 of display 500, a picture of Wayne Rooney may be shown, and additional information may be displayed in meta data section 504. At the right side of the graphical user interface, for the new seed item related to Wayne Rooney, the respective further subset of local and remote content items recommended may be displayed.

In a next step of iteration or recursion, a further seed item or content item for consuming may then be determined within the further subset (as described at B204 of FIG. 2) by means of the remote control, using navigation keys 512-1 to 512-4 and confirmation key 512-5.

Figure 5C:
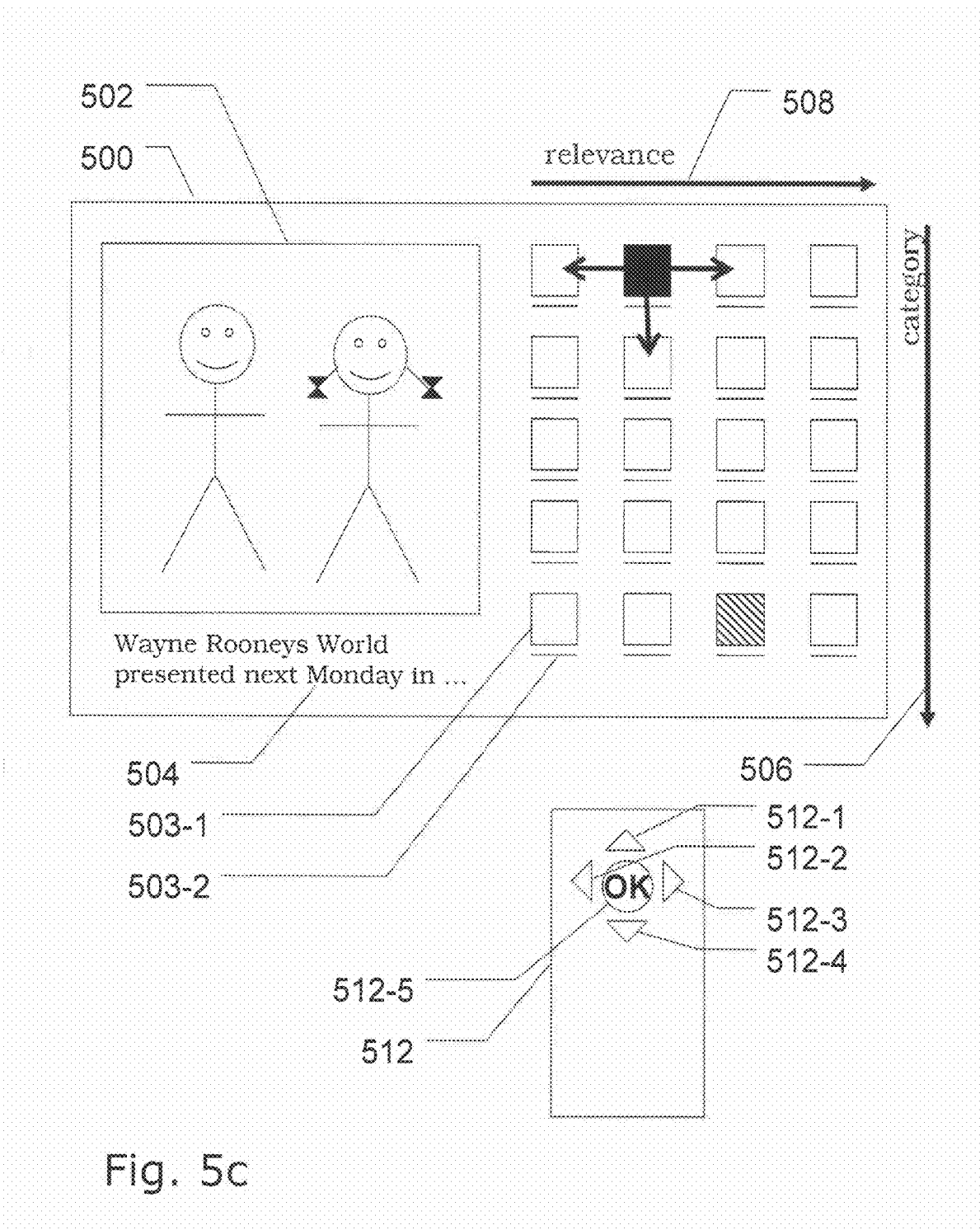
FIG. 5c illustrates a further step according to the embodiment of FIGS. 5a and 5b.

In FIG. 5*c*, it is to be assumed that a content item representing a program event scheduled for next Monday with title "Wayne Rooney's world", presenting the player's family, has been selected. This program event may, for example, be marked as content item for consuming and may, thereby, be scheduled for recording on a storage comprised within the television apparatus or on a storage externally connected to the television apparatus. Alternatively, the program event may also be included in a personalized television schedule.

Figure 6:
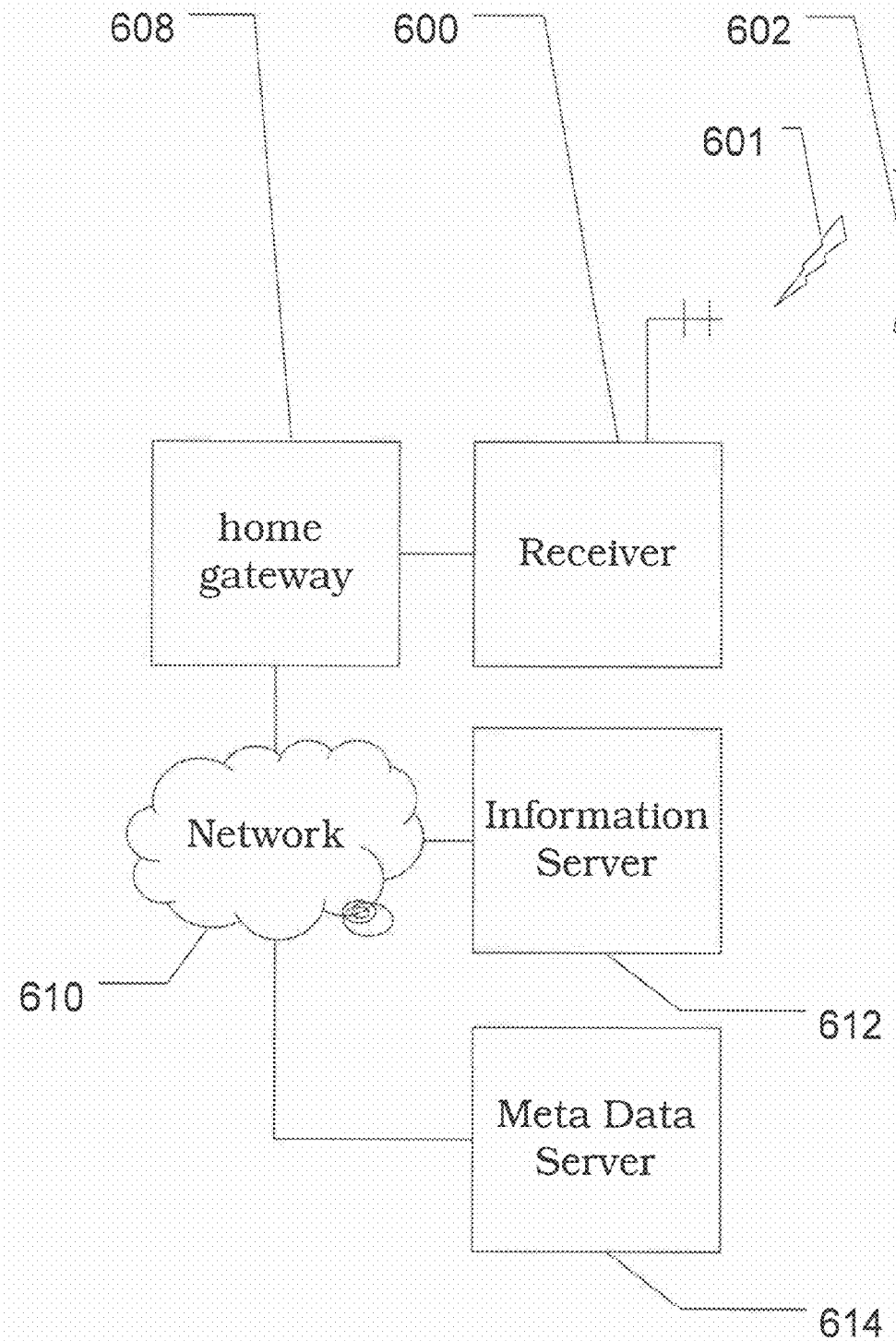
FIG. 6 illustrates an embodiment of a system for recommending local and remote content.

In FIG. 6, a system for recommending remote and local content is illustrated. The system comprises a receiver 600 adapted to receive a broadcast signal 601 trans-mitted by a broadcast station 602.

Receiver 600 may be connected through a home gateway 608 to a network 610. Receiver 600 consequently has access to broadcast television channels as well as to further information sources reachable via network 610, and thereby may allow receiving a multitude of television channels and further data from other information sources.

Receiver 600 may further have access, e.g. through home gateway 608 over network 610 to an information server 612. Information server 602 may provide recommendation information, such as crosslinked meta data recommendation table 302.

Further, receiver 600 may have access, e.g. via home gateway 608 and network 610, to a meta data server 614. Meta data server 614 may provide further meta data to be associated with at least one of the local content items.

For example, local content items may have not enough meta data to allow an effective comparison when determining the further linking information. Therefore, further meta data to be associated with a local content item having few meta data may be retrieved from meta data server 614.

Meta data server 614 may include a data base which may be queried by using the title of the local content item has a search string. In response to such a request, meta data server 614 may provide further meta data which is suitable for enhancing the local meta data richness.

Enhancing the local meta data richness may be achieved by various steps, depending on a type of the local content item.

If, for example, the local content item is a picture having a JPEG file format, the file may be searched for tags identifying meta data included in the file, such as the IPTC-tags according to the IPTC-NAA-standard. All related IPTC content may then be added to the meta data used for the comparison process.

In case that the local content item is a audio file stored, for example, according to an MP3 format, the corresponding file may be analyzed for ID3-tags for identifying and extracting further meta data from the file. The corresponding meta data may then be added to the meta data used for the comparison process.

Further, the local content item may also be analyzed by meta data server 614. For example in case that the local content item is an audio file, it may be analyzed by an internet service for identifying further meta data for audio files, such as the meta data server provided by Gracenote™ (www.gracenote.com) or by others, such as HiFind™.

If the local content item is a video, its title or file name may be analyzed for potential matches in an internet data base, e.g. provided by an online video store such as Amazon™ (www.amazon.com). If a close match is found, the meta data of the provider can be returned and included to the meta data associated with the local content item.

Further, the video may be analyzed for potential matches in a video content search engine in a similar manner to Gracenote's MusicID™ service. For example, a video sample of several seconds may be send electronically to one of these services, where it is analyzed. If a close match in the large data bases of these service providers is found, the complete meta data may be returned and associated with the local content item. For example, also images returned from the service provider may be included.

Further, a serial number of the data carrier inserted into a local reading device may be used for retrieving additional meta data from a meta data server, such as meta data server 614.

If the local content item has been captured and recorded by a user's pickup device, such as a video camera or a camera for still images, the captured content items may have been associated with meta data describing the content, e.g. manually by the user or automatically by the pickup device. For example, a location where a video has been captured may be included in the file name, or GPS data may be included as meta data in the file. This information may be used as meta data, and may further be used for retrieving further meta data, e.g. from meta data server 614. For example, a video associated with the GPS data of London may be associated with further meta data related to London, which further meta data may have been retrieved from meta data server 614 via the GPS data.

If the local content item is an episode of a television series, a related meta data server providing meta data for television series may be accessed for retrieving additional meta data, e.g. descriptions or episodes to be broadcast in the near future.

For further local content items, such as applications that may be run at the television apparatus or games, a provider server may be accessed for requesting related meta data, e.g. an application description.

By accessing meta data server 614 and retrieving further meta data related to local content items, the local meta data richness may be enhanced. As a consequence, the comparing process comparing meta data of the content items for determining the score of match may access a rich data basis. This allows an effective comparison process for determining the further linking information within the unified set including the local and remote content items.

Figure 7:
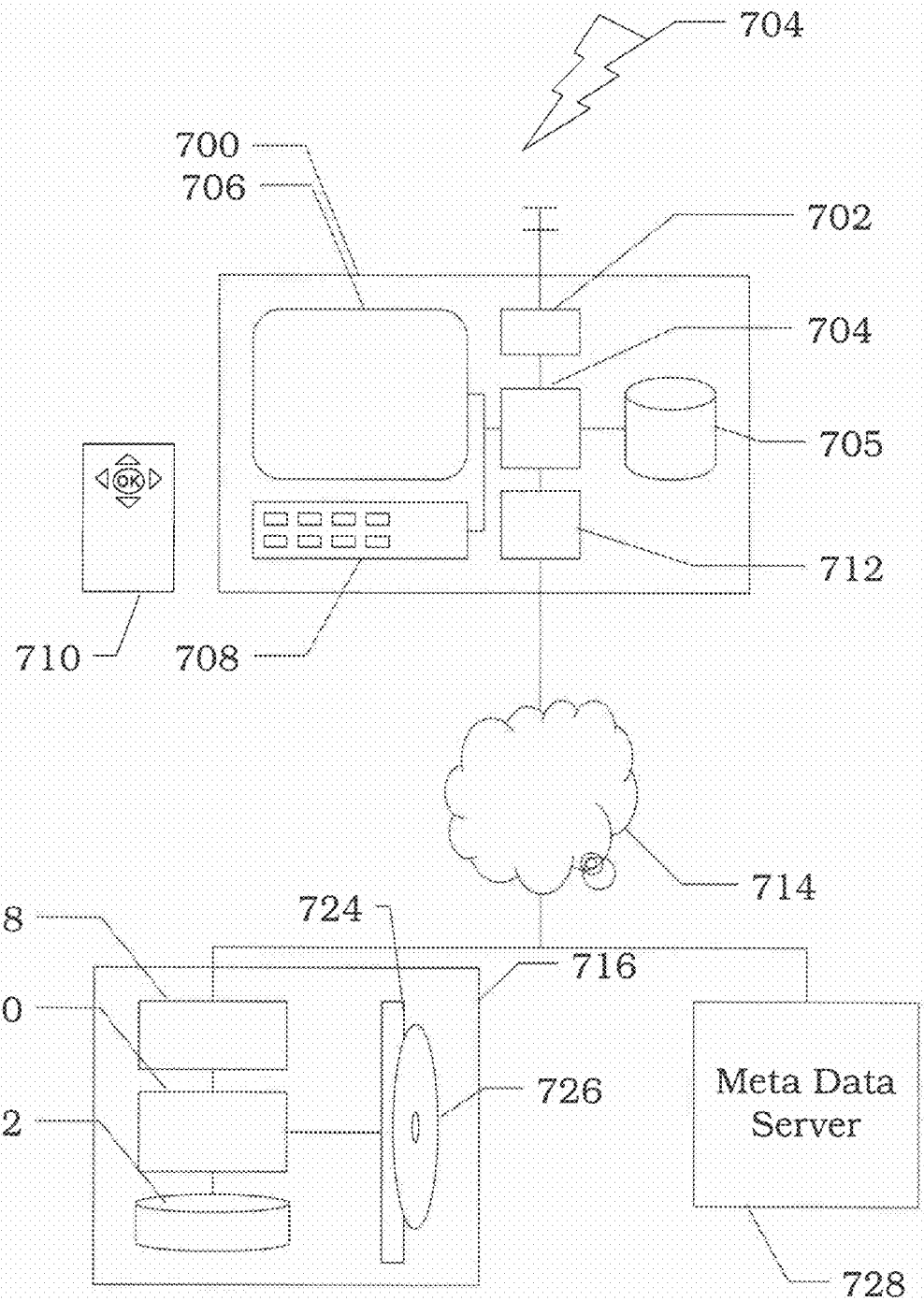
FIG. 7 illustrates a further embodiment of a system for recommending local and remote content.

In FIG. 7, a further embodiment of a system for recommending local and remote content is illustrated. The system may include a television apparatus 700 including a tuner 702 adapted to receive a broadcast signal 704 transmitted by a broadcast station (not shown). The television apparatus 700 may further include a data processor 704 and a storage 705. In storage 705, local content items, i.e. the content items of the second set, may be stored. Further locally available content items may be accessible for data processor 704 e.g. from connected external devices or via network.

Further, television apparatus 700 may include a graphical user interface including a display 706 and an input unit 708, such as a keyboard or speech input unit. Additionally, a remote control 710 may be provided.

Television apparatus 700 is further connected, by a communication unit 712, to a network 714, e.g. the internet, over which communication with a server 716 may be established.

Server 716 may include a communication unit 718, a data processor 720 and a storage 722. Further, a reading unit 724 for reading a computer readable storage medium 726 may be provided. Computer readable storage medium 726 may include program instructions adapted to cause a computer to execute any of the embodiments of the method of recommending local and remote content described herein.

Storage 722 of server 716 may be adapted to store further content items, i.e. the remote content items of the first set, as illustrated in FIG. 4. Further, linking information linking each content item of the first set to a respective subset of the first set may be stored. Further, the content items may include meta data, as described in the above, which meta data may also be stored in storage 722. Alternatively, the content items stored in storage 722 may also be represented by links, such as URIs, linking a respective content item to a resource from which it may be retrieved.

Data processor 720 may be adapted to determine, for a certain content item of the first set of remote content items, the linking information linking the certain content item to a respective subset of the first set, as described in the above for B100 of FIG. 1.

Communication unit 718 may be adapted to transmit the remote content items and the linking information linking the content items to the respective subsets over network 714 to television apparatus 700, which content items and information may then be received by Communication unit 712 of television apparatus 700 and stored in storage 705.

At television apparatus 700, data processor 704 may be adapted to determine the further linking information for each content item in a unified set including the first set of remote content items and the second set of local content items, as described, for example, at B104.

As a basis for the comparison process comparing meta data associated with the respective content items, television apparatus may access a meta data server 728 over network 714. The retrieving of further meta data for locally available content may be performed as described in the above, e.g. with respect to meta data server 614 of FIG. 6.

For supporting the user in analyzing the recommendations of local and remote content, e.g. in accordance with to the method described in FIG. 2, the graphical user interface, including display 706, input unit 708 and remote control 710 may be adapted to allow a user to select a seed item out of the unified set including local and remote content, and to select a further content item as the further seed item out of the further subset related to the seed item. This recursive or iterative determination of the further seed item, and, in the end, of the content item for consuming, may be supported by data processor 704. Display 706 may be adapted, as shown in FIGS. 5a to 5c, to display the respective further subset related to the seed item represented by images. Further, display 706 may be adapted to display the content item for consumption.

In other words, in the system depicted in FIG. 7, the respective subset for each of the content items of the first set (remote content) may be determined at server 716. The linking information linking the content items to the respective subsets may then be transmitted from server 716 to television apparatus 700 via network 714. At television apparatus 700, the second set of locally accessible content (local content) may be analyzed and integrated into the recommendations, thereby providing a unified recommendation, e.g. in form of a list or database. For including recommendations of local content into the linking information, meta data of the remote and the local content items may be compared. The comparison process may correspond to a similar or simplified version of the comparison process performed at server 716, guaranteeing a unified approach of scoring and weighting remote and local content when including it into the unified recommendation.

Thereby, the time consuming process of determining recommendations of remote content of a variety of remote information sources may be performed at server 716, where a large amount of processing power, storage and communication bandwidth for accessing further information sources may be provided. The linking information may efficiently be transmitted to television apparatus 700. At television apparatus 700, the linking information may be updated by including locally accessible content into the recommendations, e.g. based on meta data of the local content. Since the amount of locally available content may be significantly smaller than the amount of remote content, this process may be performed at television apparatus 700 even though only limited processing power and storage is available, e.g. when compared to a typical personal computer or gaming hardware platform. Due to the simplified version of the comparing algorithm, this process may terminate in a comparably short time.

After having determined the further linking information implementing the local and remote recommendations, the user is enabled to easily navigate to a large amount of local and remote content items according to his interests and personal taste, e.g. by selecting the seed item, executing the recursive or iterative process and displaying of the content item for consuming.

At least a part of the information relating the content items to the respective subsets may be transmitted from server 716 to television apparatus 700 at a point in time predetermined at the server or at the client. It may thereby be assured that linking and/or navigation information is determined upfront at the side of server 716 without consumption of processing power at television apparatus 700. Transmission and reception of the information may be performed in the background, such that it does not influence usage of television apparatus 700. A transmission time may be determined such that transmission may be completed within a period of low network traffic, allowing an efficient transmission e.g. to a large population of television apparatuses and/or other receiving devices.

Further, the determination of the further linking information may be performed when new local content is detected, e.g. when a new storage device including local content is switched on, a data carrier including local content is inserted into a reading device, or a network based personal video recorder is connected to television apparatus 700.

Figure 8:
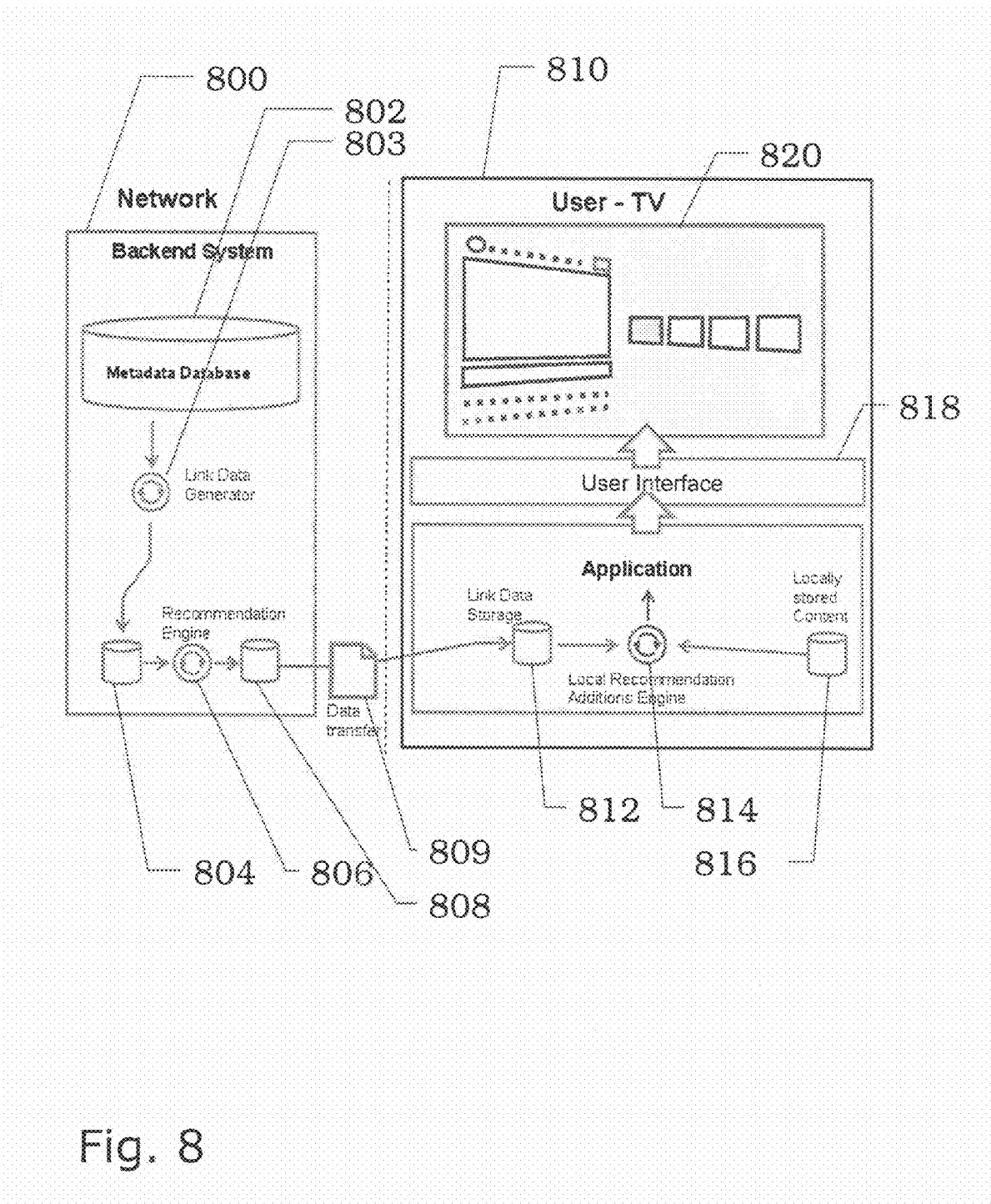
FIG. 8 illustrates a further embodiment of a system for recommending local and remote content.

In FIG. 8, a further embodiment of a system for local and remote content recommendation is illustrated. A backend system 800 includes a metadata database 802 as well as further information databases 804.

Information databases 804 may include further information, e.g. non-video items, that may be of special interest for the users within the embodiment. For example, information on persons of public interest, such as politicians, celebrities, actors or football players may be included with related information, e.g. a related picture. Further, gossip articles about actors performing the program may be included. Still further, product offerings related to meta data descriptions of program events may be included, promoting for example sound tracks, books, or videos related to program events. Information on countries, regions or cities mentioned in meta data description texts or on clubs, institutions, agencies or companies may also be included. Additionally, logos related to such information may be included, e.g. a BMW logo related to the niche television channel of BMW TV. Still further, icons e.g. reflecting a genre of program events, such as UEFA cup, tennis or fencing, may also be included.

For example, information databases 804 may include the following informational items with related attributes:
  Persons (e.g. including the attributes: Name, Photo, Biography/Filmography),
  Advertisements (e.g. including the attributes: Company name, e.g. BMW Group, images and/or logos, e.g. BMW logo, Mini logo, Rolls Royce logo, a description, an explaining sentence, such as "BMW is a car manufacturer with headquarter in Munich", promotional articles available)
  Logos (e.g. including the attributes: related Clubname(s), image/logo, a description, an explaining sentence, such as "Bayern München is a football club from Munich, Germany").
  Icons (e.g. including the attributes: Name, Flag/Icon logo, a description, an explaining sentence, such as "The United Kingdom is part of the European countries", "London is the capital of England")

Further, backend system 800 may include a recommendation engine 806, which is adapted to generate crosslinks between content items stored within metadata database 802 and information databases 804 (remote content items of the first set). The generation of crosslinks may correspond to determination of a subset of the first set of content items for each content item, based on comparing the meta data of the content item with the meta data of all other content items of the first set.

The first set of content items may include all items included in metadata database 802 and information databases 804, or may be determined as a subset of the included content items. Determination of the set based on time axis 402 and with respect to particular channels and categories may be performed as illustrated in FIG. 4. The crosslinks generated by recommendation engine 806 may then correspond to the arrows linking each remote content item 400 to the content items of the respective subset marked in black at FIG. 4.

The result of the crosslink generation may be stored in a data storage 808, providing the linking information identifying the respective subsets.

The process of generating crosslinked data may be performed upfront e.g. periodically at regular intervals. For example, a daily pre-processing of the crosslinked data is possible.

Backend system 800 maintains knowledge about connected users which are allowed to access backend system 800. These users may be considered as subscribers, having subscribed to obtain a regular content retrieval service, e.g. regular access to EPG (electronic program guide) data. These users may get customized download files at regular intervals or on demand, as illustrated with a crosslinked meta data download 809.

As described in the above, the download files may be customized according to a user configuration, configuring, for example, time axis 402 for selecting relevant content items. Further, the download files may be customized in accordance with a user's local channel line-up. Further, the download files may be customized in accordance with a device profile of the television apparatuses, for example in accordance with a storage capacity or display capacity of the television apparatus. For example, more or less crosslinked information may be transmitted depending on the storage capacity. Further, the related content items of the subset may be transmitted to the television apparatus if enough storage is available, or may be identified by address information (URI) for later download from a request of the user, if the storage capacity is low. Further, pictures, thumbnails, logos and icons may be compressed in view of the display capacity. Additionally, further customization of the download files is possible, e.g. in accordance with a user language setting or with the user profile depending on the user's personal tastes.

Once crosslinked metadata download 809 is completed, the crosslinked metadata information may be stored in data storage 812 of the user's television apparatus 810 and may thereby be accessible for a local recommendation additions engine 814. Local recommendation additions engine 814 may further have access to locally available content 816.

Local recommendation additions engine 814 may then analyze the linking information stored in data storage 812 and may include further links to locally available content 816, as described in the above, e.g. for B104, thereby generating the further linking information. The further linking information may then be passed, as a result, to a user interface application 818.

User interface application 818 may provide e.g. an EPG functionality supporting the recommendation and selection of local and remote content based on the further linking information provided by local recommendation additions engine 814, e.g. by providing the functionality as explained in FIGS. 5a to 5c. As the seed item, user interface application 818 may receive information on a currently selected channel or path. On demand of the user, e.g. by pressing an EPG button of a remote control, user interface application 818 may use the further linking information for identifying crosslinked local and remote content items linked to the seed item, assuming that the crosslinked content items may be of interest for the user.

This information may then be displayed at display 820 of the user device, e.g. in accordance with the representation of FIGS. 5a to 5c. As shown on display 820, a part of the display may be reserved for displaying the seed item and the related meta data. A further part of the display may be reserved for displaying the crosslinked information.

In other words, the configuration of the system accordingly allows pre-processing crosslinked meta data information related to remote content items upfront at backend system 800. The crosslinked meta data information is transmitted to television apparatus 810 in accordance with a user's demand or subscription, and stored in local data storage 812. At television apparatus 810, local recommendations may be added for generating a unified recommendation table. The system thereby offers to the user best matching proposals of local and remote content items related to the audio/video content the user is interested in or watching at a certain moment. Further, the graphical display may be organized with an easy to use structure for finding related content items and program events.

The network side algorithm running on server 800 may be implemented in accordance with the following pseudo code:

```
FOR ALL "subscribed users and their stored TV channel program lineup" DO
    FOR "every program item PI in the next days" DO
        IF Metadata[PI] CONTAINS "a word match in any of the backend information
databases B-DBs"
            THEN "Add crosslink to this B-DB item and add B-DB item to download if not
available on the user side already"
        ENDIF
    ENDFOR
    IF "timer expires" THEN "send cross linked Metadata Download File to all subscribed
user applications"
    /* this process happens preferably during the low network usage period */
ENDFOR
```

The local recommendation additions engine 814 may be implemented in accordance with the following pseudo code:

```
/* Step 1: Calculate any-to-any recommendation match score in array Match[I,j]
*/
FOR ALL "Programm IDs PI in Crosslinked Metadata - Recommendation Table" DO
    FOR EVERY "Programme ID PI-local in the local recordings database" DO
        "Calculate Match[PI, PI-local] by comparing the metadata vectors of PI and PI-
local"
    ENDFOR
ENDFOR
/* Step 2: Insert local programme IDs into Recommendation table depending on
```

```
score in array Match[I,j] */
FOR ALL "Programm IDs PI in Crosslinked Metadata - Recommendation Table" DO
    FOR EVERY "Programme ID PI-local in the local recordings database" DO
        INSERT PI-local INTO "Recommendation Table" IF Match[PI, PI-local] exceeds the
"existing recommendation match values"
    ENDFOR
ENDFOR
```

The user interface application 818 may be implemented in accordance with the following pseudo code:

```
FOR "every program item PI the TV user watches" DO
    FOR ALL Metadata[PI] DO
        IF Metadata[PI] has "a crosslinked information CI item" THEN
            "display Picture und description metadata of CI on the screen from local
data storage"
        ENDIF
    ENFOR
    If "the user selects crosslinked item" THEN
            "display further information of CI from local data storage or from remote
servers"
        /* if remote server access is required, the user interface may be slower than
usually */
    ENDIF
ENDFOR
```

Figure 9:
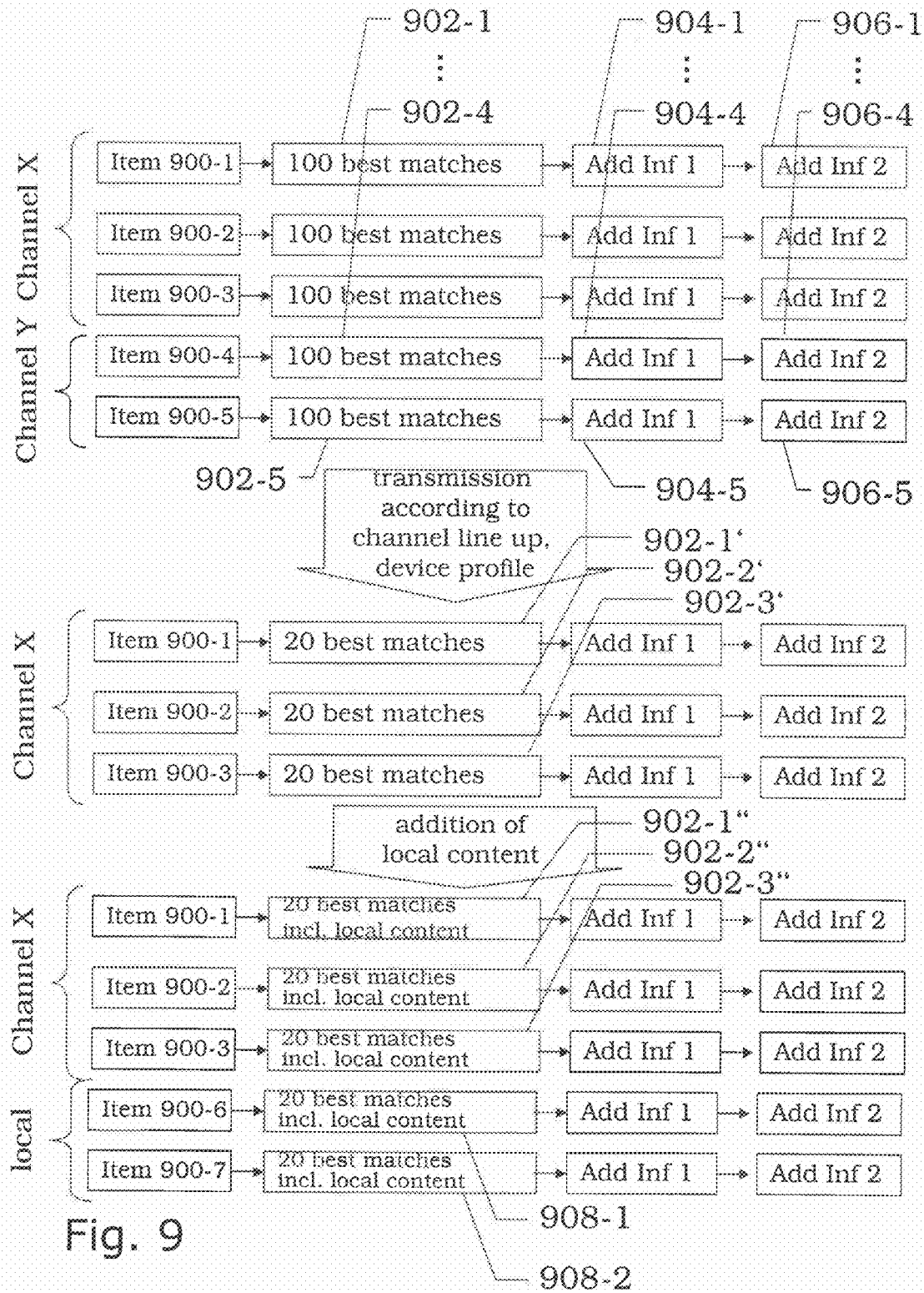
FIG. 9 illustrates a step of selecting and filtering content items and subset information, and a step of adding locally available content items in an embodiment of a method for recommending local and remote content.

FIG. 9 illustrates the determination of the crosslinked meta data, stored at data storage 808 of FIG. 8. Further, the user customized crosslinked metadata download 809 is illustrated. Additionally, the inclusion of local content is illustrated.

In the example, for all remote content items 900-1 to 900-5, 100 best matches 902-1 to 902-5 of further remote content items are determined and linked to content items 900-1 to 900-5, e.g. in accordance with a quality of match as described in the above. It should be noted that the number of 100 best matches is only an example, and that any other number of best matches may be determined, e.g. in accordance with a predefined setting.

Further, based on keywords explicitly mentioned in information databases 804 of FIG. 8, additional content items 904-1 to 904-5 and 906-1 to 906-5, e.g. corresponding to non-video content items, are also linked with items 900-1 to 900-5.

The information databases 804 may be used as a kind of "filter" within the determination of the subset of content items. This may be explained at hand of an example: Content item 900-1 is supposed to be a tennis match between Andre Agassi and a player named Marc Smith. The meta data of content item 800-1, therefore, may include the names of Andre Agassi and Marc Smith. Marc Smith, in this case, is supposed to represent a person not publicly known, while Andre Agassi is of course a well known tennis player.

Since in information databases 804 only content items of contemporary public interest may be included, it is to be supposed that the name of Andre Agassi is included, while Marc Smith is not mentioned. Accordingly, only additional information links related to Andre Agassi, the person of public interest, will be appended to the list of additional content items 904-1, thereby restricting the number of links or linked content items.

Supposing further that the public interest in Andre Agassi as a tennis player decreases over time after his retirement, his name may be excluded from information databases 804. Therefore, only links to content items of current interest, e.g. to persons of contemporary public interest, may be represented within additional content items 904-1 to 904-5 and 906-1 to 906-5.

Supposing still further, that the public interest in Andre Agassi persists in his native country, the United States of America, it may be assumed that additional content items 904-1 to 904-5 and 906-1 to 906-5 may still refer to Andre Agassi in an information database 804 used in the United States, providing information of contemporary national interest. For other nations, however, information of contemporary interest of another nation may be excluded, thereby further restricting additional content items 904-1 to 904-5 and 906-1 to 906-5 to national interests.

In the example, content items 900-1 to 900-3 belong to a channel X, while items 900-4 and 900-5 belong to a channel Y. It is to be supposed that a user requesting crosslinked metadata download 810 only has access to channel X, but not to channel Y at his television apparatus. Therefore, only the best matches for locally available channels in the personal channel lineup of television apparatus 810 could be transmitted. Consequently, only content items 900-1 to 900-3 may be transmitted to the user in accordance with the local channel line-up. Further, it may be assumed that the television apparatus has restricted storage capacity, which is known at back-end system 800. Therefore, only the 20 best matches 902-1' to 902-3' are transmitted with crosslinked metadata download 809 in accordance with a user's device profile. It should be noted that the number of 20 best matches is only an example, and that any other number of best matches may be determined, e.g. in accordance with a predefined setting of the device profile.

In a third step performed locally, e.g. at television apparatus 810, the 20 best matches 902-1' to 902-3' are updated by including local content. The local content may be included, as described in the above, based on a score of match between the content items 900-1 to 900-3 and each of the locally available content items. Thereby, the 20 best matches are updated to include respective best matches of local content, illustrated as 20 best matches including local content 902-1" to 902-3".

Further, locally available content items 900-6 and 900-7 may be included and provided with their respective 20 best matches including local content 908-1, 908-2. These matches may also refer to remote content items, e.g. content items 900-1 to 900-3.

Thereby, content to be transmitted on broadcast channels, content available on demand or stored at internet servers, and locally available content is presented in a unified, graphical approach, allowing the user to access content items of the various information sources with very few user interactions and to get a quick overview on the content that may be of interest for him or her. Accordingly, various information sources belonging to broadcast networks, IP based networks and/or local networks or devices may appear to the user as integrated, offering a quick and easy to use access, thereby enhancing the user's television experience.

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method of recommending local and remote content, comprising:
   receiving, at a television apparatus, a first set of content items and linking information linking each of the content items of the first set to a respective subset of the first set;
   providing a second set of further content items, the content items of the second set being locally available at the television apparatus; and
   determining, via a processor, for each content item in a unified set including the first and second sets further linking information linking the content item to a further subset from the unified set;
   wherein for a certain content item of the first set, the further subset is determined by adding content items of the second set to the respective subset of the certain content item, the content items added being determined by comparing meta data associated with the certain content item with meta data respectively associated with all content items of the second set,
   wherein the content items added to the respective subset of the certain content item are determined by calculating, for each of the content items of the second set, a score of match of the meta data associated with a respective content item of the second set with the meta data associated with the certain content item, and by comparing the score of match to a threshold.

2. The method of claim 1 wherein the first set of content items includes at least one of a group including program events scheduled to be broadcast within a predetermined period of time, program events accessible on demand by the user, and non-video content items.

3. The method of claim 1, further comprising:
   selecting, by a user of the television apparatus, a content item out of the unified set as a seed item;
   executing a recursive or iterative process until one of the content items of the unified set is determined by the user as a content item for consuming, the process including displaying the respective further subset of the seed item at a display in connection with the television apparatus, each of the content items of the respective further subset being represented by a respective image; and
   selecting, by the user, a further content item of the respective further subset displayed as the seed item or as a content item for consuming; and
   displaying, at the display, the content item determined for consuming.

4. The method of claim 1, wherein the further subset for each content item in the unified set is determined when additional content items are added to the second set.

5. The method of claim 1, wherein the further subset for each content item in the unified set is determined when the first set of content items and the linking information relating the content items to the respective subsets is received.

6. The method of claim 1, wherein for a certain content item of the second set, further meta data to be associated with the certain content item is retrieved from a remotely located server.

7. The method of claim 1, wherein for a content item of the second set, the meta data includes a ranking of the user, and the further subset for a certain content item of the unified set is determined by analyzing the ranking.

8. The method of claim 1, wherein the respective further subset of the seed item displayed at the display is grouped by categories, the category of a certain content item being determined by analyzing the meta data associated with the certain content item.

9. The method of claim 1, wherein the further content item is selected by a user by use of at least one navigation key, the navigation key allowing to mark the images displayed at the display, and of at least one confirmation key for selecting a marked image.

10. The method of claim 3, wherein a size of the respective further subset of content items displayed is adapted to a display capacity of a display device and/or to human cognitive reception capacity.

11. The method of claim 3, wherein the image is a thumbnail item.

12. A television apparatus, comprising a receiver to receive a first set of content items and linking information linking each of the content items of the first set to a respective subset of the first set;
   a storage to store the first set and the linking information;
   a data processor to access a second set of further content items, the further content items being locally available at the television apparatus, and to determine further linking information for each content item in a unified set including the first and second sets, the further linking information linking the content item to a further subset from the unified set;
   wherein for a certain content item of the first set, the further subset is determined by adding content items of the second set to the respective subset of the certain content item, the content items added being determined by comparing meta data associated with the certain content item with meta data respectively associated with all content items of the second set,
   wherein the content items added to the respective subset of the certain content item are determined by calculating, for each of the content items of the second set, a score of match of the meta data associated with a respective content item of the second set with the meta data associated with the certain content item, and by comparing the score of match to a threshold.

13. A system, comprising a server; and
a television apparatus;
wherein the server determines a first set of content items and linking information linking each of the content items of the first set to a respective subset of the first set, and transmits the first set of content items and the linking information to the television apparatus, and
wherein the television apparatus receives and stores the first set of content items and the linking information, accesses a second set of further content items, the further content items being locally available at the television apparatus, and determines, for each content item in a unified set including the first and second sets, further linking information linking the content item to a further subset from the unified set, wherein for a certain content item of the first set, the further subset is determined by adding content items of the second set to the respective subset of the certain content item, the content items added being determined by comparing meta data associated with the certain content item with meta data respectively associated with all content items of the second set,
wherein the content items added to the respective subset of the certain content item are determined by calculating, for each of the content items of the second set, a score of match of the meta data associated with a respective content item of the second set with the meta data associated with the certain content item, and by comparing the score of match to a threshold.

14. A non-transitory computer readable storage device including program instructions, which when loaded into a processor cause a computer to execute a method of recommending local and remote content, the method comprising:
receiving, at a television apparatus, a first set of content items and linking information linking each of the content items of the first set to a respective subset of the first set;
providing a second set of further content items, the content items of the second set being locally available at the television apparatus; and
determining for each content item in a unified set including the first and second sets, further linking information linking the content item to a further subset from the unified set;
wherein for a certain content item of the first set, the further subset is determined by adding content items of the second set to the respective subset of the certain content item, the content items added being determined by comparing meta data associated with the certain content item with meta data respectively associated with all content items of the second set,
wherein the content items added to the respective subset of the certain content item are determined by calculating, for each of the content items of the second set, a score of match of the meta data associated with a respective content item of the second set with the meta data associated with the certain content item, and by comparing the score of match to a threshold.

* * * * *